United States Patent
Lee et al.

(10) Patent No.: US 10,425,701 B2
(45) Date of Patent: Sep. 24, 2019

(54) FILTER REUSE METHOD FOR TRANSMITTING AND RECEIVING FILTER BANK-BASED MULTICARRIER SIGNALS

(71) Applicant: Samsung Electronics Co., Ltd., Suwon-si, Gyeonggi-do (KR)

(72) Inventors: Byunghwan Lee, Yongin-si (KR); Jiyun Seol, Seongnam-si (KR); Kyeongyeon Kim, Hwaseong-si (KR); Chanhong Kim, Suwon-si (KR); Yeohun Yun, Hwaseong-si (KR); Min Sagong, Suwon-si (KR); Suryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 15/549,130

(22) PCT Filed: Feb. 1, 2016

(86) PCT No.: PCT/KR2016/001068
§ 371 (c)(1),
(2) Date: Aug. 4, 2017

(87) PCT Pub. No.: WO2016/126062
PCT Pub. Date: Aug. 11, 2016

(65) Prior Publication Data
US 2018/0035179 A1  Feb. 1, 2018

(30) Foreign Application Priority Data
Feb. 5, 2015  (KR) .................. 10-2015-0017955

(51) Int. Cl.
| | |
|---|---|
| H04Q 3/00 | (2006.01) |
| H04W 52/40 | (2009.01) |
| H04W 16/18 | (2009.01) |
| G06F 17/14 | (2006.01) |
| H04L 1/00 | (2006.01) |

(Continued)

(52) U.S. Cl.
CPC .......... *H04Q 3/002* (2013.01); *H04L 5/0035* (2013.01); *H04L 5/0073* (2013.01); *H04W 16/00* (2013.01);
(Continued)

(58) Field of Classification Search
CPC ......... H04Q 3/002; H04Q 2213/13204; H04Q 2213/13176; H04L 5/0073; H04L 5/0035; H04W 16/00; H04W 72/04
See application file for complete search history.

(56) References Cited

U.S. PATENT DOCUMENTS

| | | | |
|---|---|---|---|
| 6,294,956 B1 * | 9/2001 | Ghanadan | H03F 3/211 330/124 R |
| 2004/0189277 A1 * | 9/2004 | Michel | G06F 17/14 324/76.16 |

(Continued)

FOREIGN PATENT DOCUMENTS

| | | |
|---|---|---|
| EP | 2713542 A1 | 4/2014 |
| KR | 1020160028818 A | 3/2016 |

OTHER PUBLICATIONS

ISA/KR, "International Search Report", Application No. PCT/KR2016/001068, dated Jun. 3, 2016, 3 pages.
(Continued)

*Primary Examiner* — Kiet Tang

(57) ABSTRACT

The present disclosure relates to a 5G or pre-5G communication system for supporting a higher data transmission rate after 4G communication systems such as LTE. A method according to an embodiment of the present invention is a communication method in a base station which communicates via filter bank-based multicarrier signals. The method may comprise the steps of: performing communication by allocating filters having non-orthogonality with respect to a first terminal positioned within a cell; selecting a filter set from among two or more filter sets having orthogonality (Continued)

with respect to a second terminal positioned at the edge of the cell; and performing communication by allocating, to the second terminal, at least one filter among filters included in the selected filter set.

19 Claims, 21 Drawing Sheets

(51) Int. Cl.
*H04L 5/00* (2006.01)
*H04W 16/00* (2009.01)
*H04W 72/04* (2009.01)

(52) U.S. Cl.
CPC .. *H04W 72/04* (2013.01); *H04Q 2213/13176* (2013.01); *H04Q 2213/13204* (2013.01)

(56) References Cited

U.S. PATENT DOCUMENTS

| | | | |
|---|---|---|---|
| 2005/0220195 A1* | 10/2005 | Shimizu | H03H 11/04 375/257 |
| 2007/0004337 A1 | 1/2007 | Biswas et al. | |
| 2007/0258529 A1 | 11/2007 | Liang et al. | |
| 2008/0187065 A1 | 8/2008 | Chang et al. | |
| 2008/0232483 A1* | 9/2008 | Yang | H04L 25/0228 375/260 |
| 2008/0287130 A1* | 11/2008 | Laroia | H04W 36/18 455/436 |
| 2012/0115463 A1* | 5/2012 | Weng | H04L 1/0026 455/425 |
| 2014/0011535 A1* | 1/2014 | Jeon | H04W 52/40 455/522 |
| 2014/0092882 A1 | 4/2014 | Sankar et al. | |
| 2014/0098783 A1 | 4/2014 | Wan et al. | |
| 2014/0099881 A1 | 4/2014 | Boudreau et al. | |
| 2014/0233437 A1 | 8/2014 | Abdoli et al. | |
| 2014/0334436 A1* | 11/2014 | Qu | H04L 5/005 370/330 |
| 2017/0201317 A1 | 7/2017 | Lee et al. | |

OTHER PUBLICATIONS

ISA/KR, "Written Opinion of the International Searching Authority," Application No. PCT/KR2016/001068, dated Jun. 3, 2016, 6 pages.

* cited by examiner

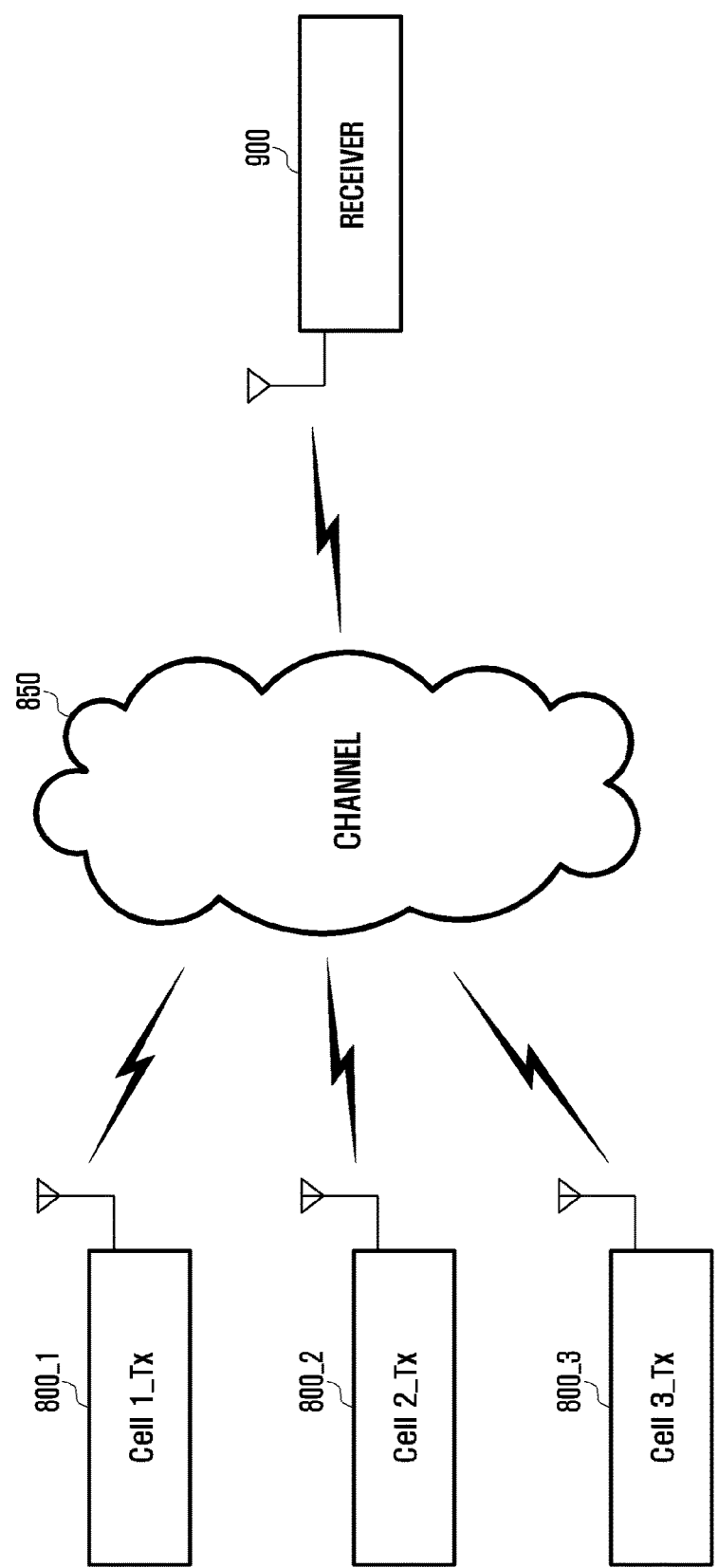

FILTER REUSE METHOD FOR TRANSMITTING AND RECEIVING FILTER BANK-BASED MULTICARRIER SIGNALS

CROSS-REFERENCE TO RELATED APPLICATIONS

The present application claims priority under 35 U.S.C. § 365 and is a 371 National Stage of International Application No. PCT/KR2016/001068 filed Feb. 1, 2016, which claims the benefit of Korean Patent Application No. 10-2015-0017955 filed Feb. 5, 2015, the disclosures of which are fully incorporated herein by reference into the present disclosure as if fully set forth herein.

TECHNICAL FIELD

The present invention relates to an apparatus and method for transmitting and receiving filter bank-based multicarrier signals and, in particular, to an apparatus and method for transmitting and receiving multicarrier signals by reusing filters.

BACKGROUND

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive Multiple-Input Multiple Output (MIMO), Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

Furthermore, the ongoing research includes the use of Hybrid Frequency Shift Keying (FSK) and Quadrature Amplitude Modulation (QAM){FQAM} and Sliding Window Superposition Coding (SWSC) as Advanced Coding Modulation (ACM), Filter Bank MultiCarrier (FBMC), Non-Orthogonal Multiple Access (NOMA), and Sparse Code Multiple Access (SCMA).

With the growing demand for mobile data, Orthogonal Frequency Division Multiple Access (OFDMA) has emerged as one of the promising multiple access schemes capable of meeting the high data rate requirements of the $4^{th}$ Generation (4G) mobile communication systems and substituting legacy $3^{rd}$ Generation (3G) mobile communication systems that adopt Code Division Multiple Access (CDMA) as their multiple access scheme. OFDMA makes it possible to use multiple orthogonal frequency components for transmitting data and thus is superior to the 3G access scheme represented by CDMA in view of data rate. For this reason, OFDMA is adopted in various radio communication systems including Long Term Evolution (LTE) and LTE-Advanced (LTE-A) and Wireless Broadband (WiBro).

However, the explosive growth of data demand results in a need for a multiple access technique, for use in the next generation (beyond 4G) mobile communication system, that is more efficient than Cyclic Prefix Orthogonal Frequency Division Multiplexing (CP-OFDM).

The aforementioned FBMC is one of promising candidate techniques capable of transmitting data at a data rate higher than that of the OFDMA-based mobile communication system.

In comparison with the legacy CP-OFDM, an FBMC system is expected to provide a large gain in the symbol transfer rate in terms of obviating the need of CP, by which the CP-OFDM is characterized. In view of transmission signals, the FBMC is mainly characterized by band filters with a long-time length and in that symbols are overlapped in the time domain for symbol transmission efficiency. Accordingly, if data transmission is performed for a sufficiently long time, the symbol transfer rate of the FBMC system becomes equal to that in the case of CP-less transmission of the legacy CP-OFDM system.

Meanwhile, much research has been conducted to reuse constrained resources in a mobile communication system. Legacy cellular communication systems have used a frequency reuse technique on some resources of virtual sectors of each cell to reduce inter-cell interference.

However, such a technique has a lack of success in suppressing interference between uplink signals transmitted by terminals located within neighboring cells and, especially in a heterogeneous network (HetNet) environment in which macro and small cells coexist, it is not easy to control the inter-cell interference. Furthermore, in the case of adopting the enhanced Inter-Cell Interference Coordination (eICIC) with Almost Blank Subframe (ABS), it becomes more difficult to control interference.

SUMMARY

The present invention provides an FBMC transmission apparatus and method capable of minimizing inter-cell interference in a multi-cell environment.

Also, the present invention provides an FBMC transmission apparatus and method capable of minimizing interference with an orthogonalized prototype filter in an uplink multi-user access environment.

Also, the present invention provides an FBMC transmission apparatus and method capable of minimizing inter-cell interference between macro and small cells and simplifying scheduling in a small cell environment.

In accordance with an aspect of the present invention, a filter reuse method of a base station for performing filter bank-based multicarrier communication includes allocating a non-orthogonal filter to a first terminal located in a cell center area, selecting one of two or more orthogonal filter sets for a second terminal located within a cell edge area, and allocating at least one of the filters included in the selected filter set to the second terminal.

In accordance with another aspect of the present invention, a filter reuse apparatus of a base station for performing filter bank-based multicarrier communication includes a coder which encodes data to transmit; a modulator & mapper which performs modulation and mapping on the encoded signal; an IFFT processing unit which performs Inverse Fast Fourier Transform (IFFT) on the modulated and mapped signal; a prototype filter unit which includes the non-orthogonal filters for allocation to the first terminal, which is capable of communicating at the normal power level, and the orthogonal filter sets for allocation to the second terminal, which is capable of communicating at the power level boosted from the normal power level, and performs filtering on the IFFT-ed symbols; and a controller which selects one of the non-orthogonal filters or one of the orthogonal filter sets depending on the location of the terminal to communicate data and controls the prototype filter unit to filter the signal input thereto with the selected filter or filter set.

In accordance with another aspect of the present invention, a filter reuse apparatus of a base station for performing filter bank-based multicarrier communication includes a coder which encodes data to transmit; a modulator and mapper which performs modulation and mapping on the encoded signal; a prototype filter unit which includes the non-orthogonal filters for allocation to the first terminal, which is capable of communicating at the normal power level, and the orthogonal filter sets for allocation to the second terminal, which is capable of communicating at the power level boosted from the normal power level, and performs filtering on the modulated and mapped symbol; an IFFT processing unit which performs Inverse Fast Fourier Transform (IFFT) on the modulated and mapped signal; and a controller which selects one of the non-orthogonal filters or one of the orthogonal filter sets depending on the location of the terminal to communicate data and controls the prototype filter unit to filter the signal input thereto with the selected filter or filter set.

In accordance with another aspect of the present invention, a filter reuse apparatus of a terminal for performing filter bank-based multicarrier communication includes a prototype filter unit which performs filtering on the input signal using the non-orthogonal filter or the orthogonal filter, an FFT processing unit which performs the FFT on the filtered signal, a channel estimator which performs channel estimation based on output from the FFT processing unit, and an equalizer which performs equalizing on the symbols output from the FFT processing unit, a de-mapper which performs de-mapping on the equalized signal in a reverse order of mapping performed at a transmission device, a channel decoder which performs channel-decoding on the de-mapped signal, and a reception controller which controls a prototype filter unit to select a filter for signal filtering based on filter information received from a base station.

In accordance with still another embodiment of the present invention, a filter reuse apparatus of a terminal for performing filter bank-based multicarrier communication includes an FFT processing unit which performs FFT on the input signal, a channel estimator which performs channel estimation based on output from the FFT processing unit, an equalizer which performs equalization on the symbols output from the FFT processing unit based on output from the channel estimator, a prototype filter unit which performs filtering on output of the equalizer using the non-orthogonal filter or the orthogonal filter, a de-mapper which performs de-mapping on the equalized signal in a reverse order of mapping performed at a transmission device, a channel decoder which performs channel-decoding on the de-mapped signal, and a reception controller which controls a prototype filter unit to select a filter for signal filtering based on filter information received from a base station.

The FBMC transmission apparatus and method of the present invention is advantageous in terms of minimizing inter-cell interference in a multi-cell environment. Also, the FBMC transmission apparatus and method of the present invention is advantageous in terms of minimizing interference using an orthogonalized prototype filter in an uplink multi-user access environment. Also, the FBMC transmission apparatus and method of the present invention is advantageous in terms of minimizing interference between macro and small cells and simplifying scheduling in a small cell environment.

BRIEF DESCRIPTION OF DRAWINGS

FIG. 8A is a diagram illustrating data communication using filter sets according to the present invention;

DETAILED DESCRIPTION

Exemplary embodiments of the present invention are described in detail with reference to the accompanying drawings. The same reference numbers are used throughout the drawings to refer to the same or like parts. The accompanying drawings are provided to help understanding of the present invention; thus, the present invention is not limited by any shape or arrangement. Detailed descriptions of well-known functions and structures incorporated herein may be omitted to avoid obscuring the subject matter of the present invention. This aims to omit unnecessary description so as to make clear the subject matter of the present invention.

Figure 1:
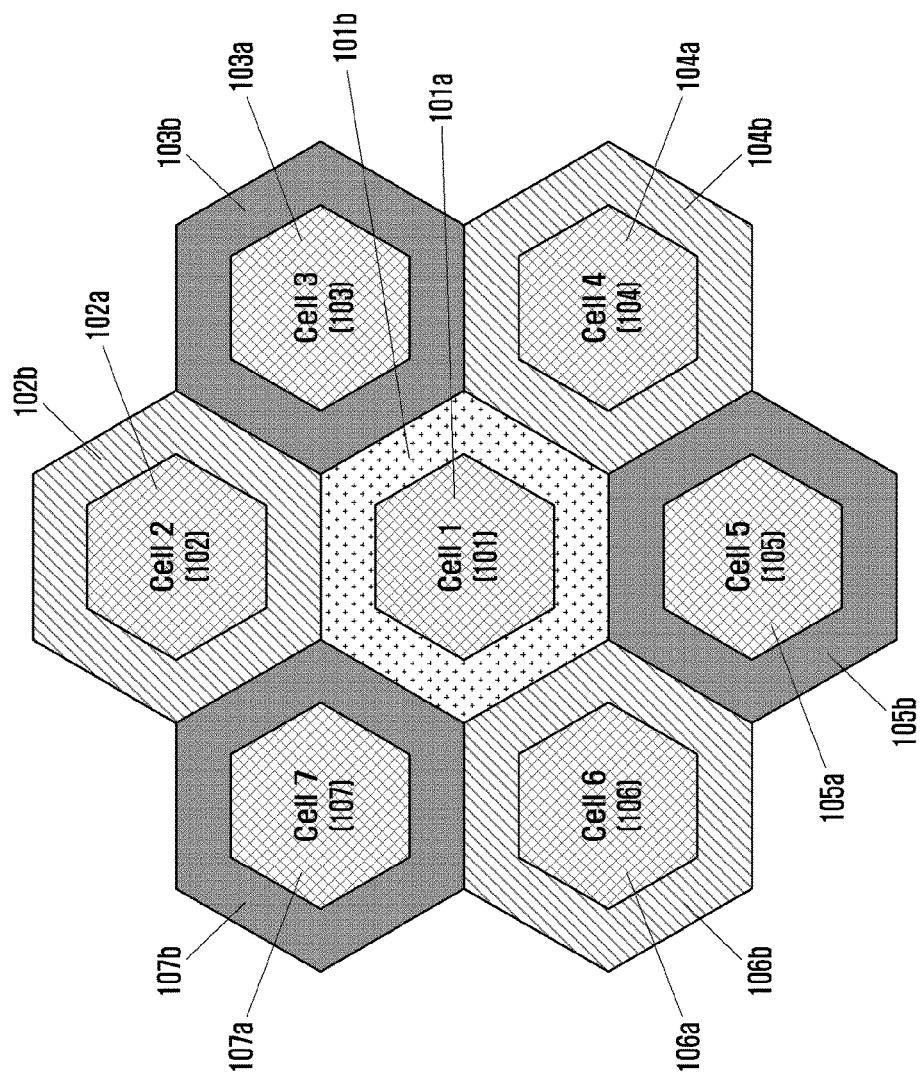
FIG. 1 is a diagram illustrating a cellular network topology comprised of a plurality of cells of which each is divided into near and far regions concentric on a base station.

A description is first made of a widely used cellular network topology with reference to FIG. 1.

FIG. 1 is a diagram illustrating a cellular network topology comprised of a plurality of cells of which each is divided into near and far regions concentric on a base station.

In FIG. 1, each of the hexagonal cells denotes the coverage of a base station. Accordingly, FIG. 1 exemplifies a cellular network comprised of a first cell (cell 1) 101, a second cell (cell 2) 102, a third cell (cell 3) 103, a fourth cell (cell 4) 104, a fifth cell (cell 5) 105, a sixth cell (cell 6) 106, and a seventh cell (cell 7) 107. The individual cells 101 to 107 have their respective near regions 101a, 102a, 103a, 104a, 105a, 106a, and 107a and far regions 101b, 102b, 103b, 104b, 105b, 106b, and 107b.

The near regions 101a to 107a are characterized by the needlessness to consider interference from other cells, while the far regions 101b to 107b are characterized by the need to consider interferences from other cells.

In the case of dividing the coverage area of a base station into near and far regions, the base station has to boost its transmit power to transmit data to a terminal located in the far region. If the base station can acquire the location information of the terminal, it may be able to determine whether the terminal is in the near region or the far region based on the terminal location information. Although FIG. 1 depicts the near and far regions ideally, it should be noted that the near and far regions are likely to differ in shape from the shape depicted in FIG. 1.

In the cellular network configured as above, a frequency reuse scheme is used to avoid interference. The frequency reuse scheme is described herein with reference to FIG. 2.

Figure 2:
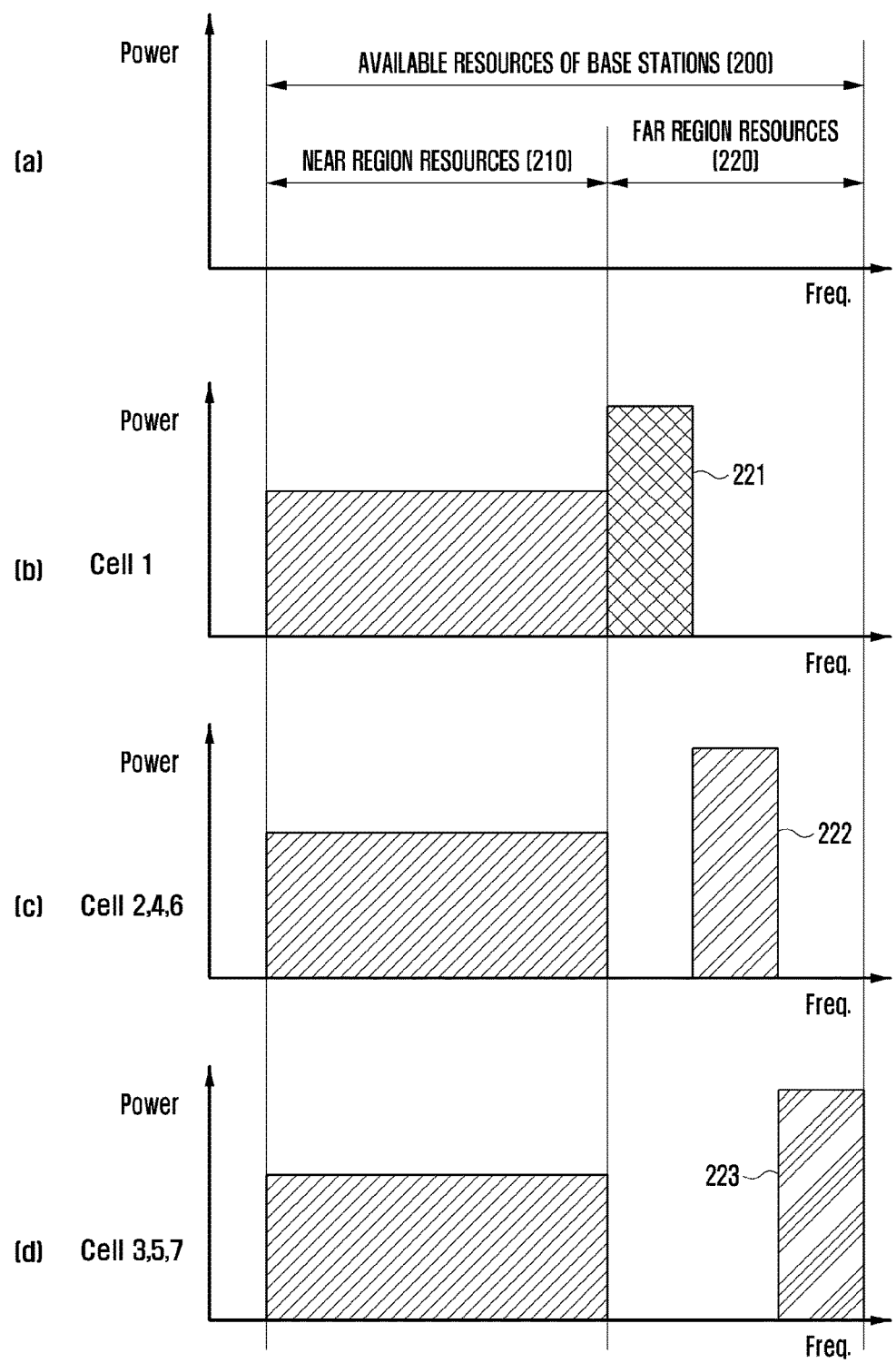
FIG. 2 is a diagram for explaining frequency reuse in the cellular network of FIG. 1.

FIG. 2 is a diagram for explaining frequency reuse in the cellular network of FIG. 1.

Part (a) of FIG. 2 shows available resources 200 of base stations, the available resources being divided into near region resources 210 and far region resources 220. Parts (b) to (d) of FIG. 2 exemplify how the resources are allocated in the near and far regions of the respective cells in the cellular network as configured in FIG. 1. A detailed description thereof is made hereinafter.

The terminals located within the near regions 101a to 107a of the first to seventh cells 101 to 107 of the respective base stations may be commonly allocated the near region resources 210 as exemplified in part (a) of FIG. 2. For example, although part of the near region resources 210 are allocated to a first terminal (not shown) located within the near region of the first cell 101, the same resources may be simultaneously allocated to a second terminal (not shown) in the near region of the second cell 102. The same resources may be allocated to the terminals in the near regions of the third to seventh cells 103 to 107 based on the same principle.

Meanwhile, the far region resources 220 may be allocated to the terminals located discretely to the terminals located within different cells. The far region resources 220 may be divided into three resource regions 221, 222, and 223 to avoid interference among the neighboring cells deployed as shown in FIG. 1. The resource regions 221, 222, and 223 may be allocated to the terminals located separately within different cells to avoid interference among the cells.

As shown in parts (b) to (d) of FIG. 2, the terminal(s) located within the far region 101b of the first cell 101 may be allocated the resources of the first resource region 211 of the far region resources 220, the terminal(s) located within the far areas 102b, 104b, and 106b of the second, fourth, and sixth cells 102b, 104b, and 106b may be allocated the resources of the second resource region 222 of the far region resources 220, and the terminal(s) located within the far regions 103b, 105b, and 107b of the third, fifth, and seventh cells 103, 105, and 107 may be allocated the resources of the third resource region 223 of the far region resources 220.

Hereinafter, a description is made of the resource reuse scheme for use in the filter band-based network according to an embodiment of the present invention.

Figure 3:
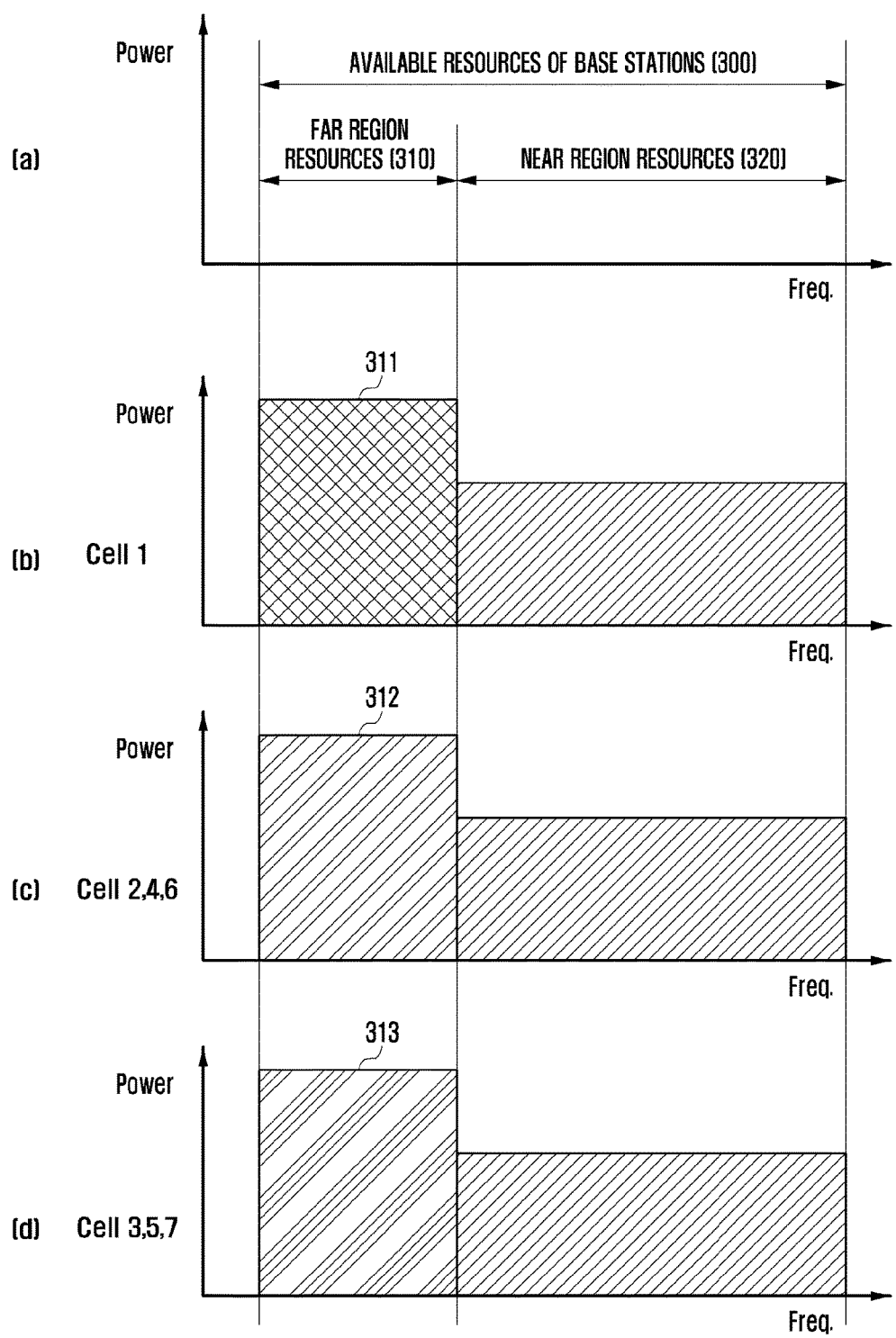
FIG. 3 is a conceptual diagram for explaining a resource reuse technique adopted to a cellular network using a filter bank scheme according to an embodiment of the present invention.

FIG. 3 is a conceptual diagram for explaining a resource reuse technique adopted to a cellular network using a filter bank scheme according to an embodiment of the present invention.

Part (a) of FIG. 3 shows available resources 300 of base stations, the available resources being divided into far region resources 310 and near region resources 320. Parts (b) to (d) of FIG. 3 exemplify how the resources are allocated in the near and far regions of the respective cells in the cellular network as configured in FIG. 1. A detailed description thereof is made hereinafter.

The terminals located within the near regions 101a to 107a of the first to seventh cells 101 to 107 of the respective base stations may be commonly allocated the near region resources 320 as configured in part (a) of FIG. 3. For the near region resources 320, it may be possible to use non-orthogonal prototype filters. By generating the non-orthogonal filters in various types, it may be possible to maximize the capacity in the near regions of the cells.

Meanwhile, the terminals located within the far regions 101b to 107b of the first to seventh cells 101 to 107 of the respective base stations may be commonly allocated the far region resources 310 as configured in part (a) of FIG. 3. In this case, however, it may be possible to use orthogonal filters for the far region resources 310. By using the orthogonal filters for the resources to be allocated to the terminals located within the far regions 101b to 107b, it may be possible to minimize the interference from neighboring cells.

In more detail, although part of the near region resources 320 are allocated to a first terminal (not shown) located within the near region of the first cell 101, the same resources may be simultaneously allocated to a second terminal (not shown) located in the near region of the second cell 102. The same resources may be allocated to the terminals in the near regions of the third to seventh cells 103 to 107 based on the same principle. For the terminals located within the near regions of the respective cells, it may be possible to use non-orthogonal prototype filters.

Here, the prototype filters for the far region resources as exemplified in parts (b), (c), and (d) of FIG. 3 may be sorted in different filter sets. For example, the filters for use by the terminals located within the near region 101a of the first cell 101 may be sorted into a first filter set ($P_1$), the filters for use by the terminals located within the near regions 102a, 104a, and 106a of the second, fourth, and sixth cells 102, 104, and 106 into a second filter set ($P_2$), and the filters for use by the terminals located within the near regions 103a, 105a, and 107a of the third, fifth, and seventh cells 103, 105, and 107 into a third filter set ($P_3$).

Meanwhile, although the far region resources 310 (frequency resources) can be commonly allocated too, orthogonal prototype filters may be used therefor. That is, the prototype filters for use within the far region 101a of the first cell 101 is sorted into a fourth filter set ($P_4$), the prototype filters for use within the far regions 102b, 104b, 106b of the second, fourth, and sixth cells 102, 104, and 106 into a fifth filter set ($P_5$), and the prototype filters for use within the far regions 103b, 105b, and 107b of the third, fifth, and seventh cells 103, 105, and 107 into a sixth filter set ($P_6$).

In this way, QAM-FBMC schemes use multiple orthogonal filter sets. Accordingly, in the case of using a QAM-FBMC scheme, it may be possible to use orthogonal filters for neighboring cells. In the case of using the orthogonal prototype filter sets, it may be possible to generate the filter sets by increasing the number of orthogonal filters complying with the same prototype filter generation constraint.

A description is briefly made hereinafter of the methods for designing orthogonal filters. There are many methods for designing orthogonal filters. The design of orthogonal filters is constrained by Signal to Interference Ratio (SIR), Spectrum Confinement, and Time Confinement. For example, the optimized function of formula (1) represents a method for designing multiple orthogonal filters using the SIR and Spectrum Confinement.

$$\underset{P_{T,b,0}}{\text{minimize}}\ 2L \sum_{(b',s')}^{all\ sc} \left( \sum_{k=0}^{2L-1} \left| \sum_{m=0}^{M-1} P_{T,b,s}^{2N}[k-2Lm] P_{T,b',s'}^{2N},[k-2Lm]^* \right|^2 \right) - 1 \quad (1)$$

$$\text{subject to } \left| \sum_{k=1}^{I} k^q \text{Re}\{P_{T,b,s}[k]\} \right| < 10^{-7}, q = 0, 2, 4$$

$$\left| \sum_{k=1}^{I} k^r \text{Im}\{P_{T,b,s}[k]\} \right| < 10^{-7}, r = 1, 3, 5$$

$$P_{T,b,s}[k] = 0,\ L-1+N_{tap} < k < N-(L-1)-N_{tap}$$

In Formula (1), the first row expresses an SIR cost function, and the second row and following rows equation express the constraint of Spectrum Confinement.

In the above optimization function, the subscript b of the prototype filter $P_T$ denotes the index of an orthogonal filter and its range is determined according to the number of orthogonal filters.

The subscript b of $P_T$ denotes the orthogonal filter index, and s denotes a sibling of the prototype filter which is generated by shifting a base filter on the time axis. Also, (b', s') including its original form of (b, s) denotes all pairs of indices of filters causing interference. In addition, "all sc" denotes all subcarriers corresponding to (b', s').

In formula (1), "L" denotes an index indicating an overlap amount of a symbol (e.g., OFDM symbol before being processed into FBMC symbol) after being filtered by the prototype filter. "M" denotes a sample size of the symbol (e.g., OFDM symbol before being processed into FBMC symbol) before being filtered by the prototype filter. In formula (1), the filter length of the prototype filter on the frequency axis is determined by (2L−1)+2Ntap, where Ntap denotes the number of additional filter coefficient in one direction from the center of 0 (DC) in addition to the number of filter coefficients indicated by the overlapping index L. Also, "k" denotes the frequency index, "I" denotes a value for restricting the number of non-zero filter coefficients on the frequency axis, and "q" and "r" are parameters for adjusting the discrete maximum value on the time axis. For reference, Lm denotes the product of L and m.

Although the prototype filter sets having the orthogonal characteristic match the transmit filters, they have a characteristic in that the SINR of the received signal is maximized only when using a receive filter mismatching the transmit filter. Accordingly, in the case of using the orthogonal prototype filter sets in a FBMC system, it may be possible to minimize interference to a signal filtered with an orthogonal filter that is not designated for the reception nodes. In the case of using the orthogonal filters, the throughput decreases as much as the number of orthogonal filter sets. For example, if three orthogonal filter sets are used, the throughput drops to ⅓.

In the case of using the orthogonal prototype filter sets, a terminal may be possible to remove the signals received through other orthogonal filter sets. The orthogonal filter selection method is not discussed in the present invention. This is because a base station may select the optimal filter through optimal filter information exchange with the terminal or based on the feedback from the terminal. That is, the resource allocated to a terminal may be fixed and, if need be, changed through the scheduling operation of the base station based on the feedback from the terminal and information exchange between the base station and terminal.

In the case of applying the orthogonal prototype filter sets according to the present invention, it may be possible to minimize interference to multiple cell edge terminals. It may also be possible to reduce frequency selectivity at the cell edge because of the frequency diversity effect of the prototype filtering. Assuming that k orthogonal filter sets are used, it may be possible to expect k-times higher frequency diversity effect.

Figure 4A:
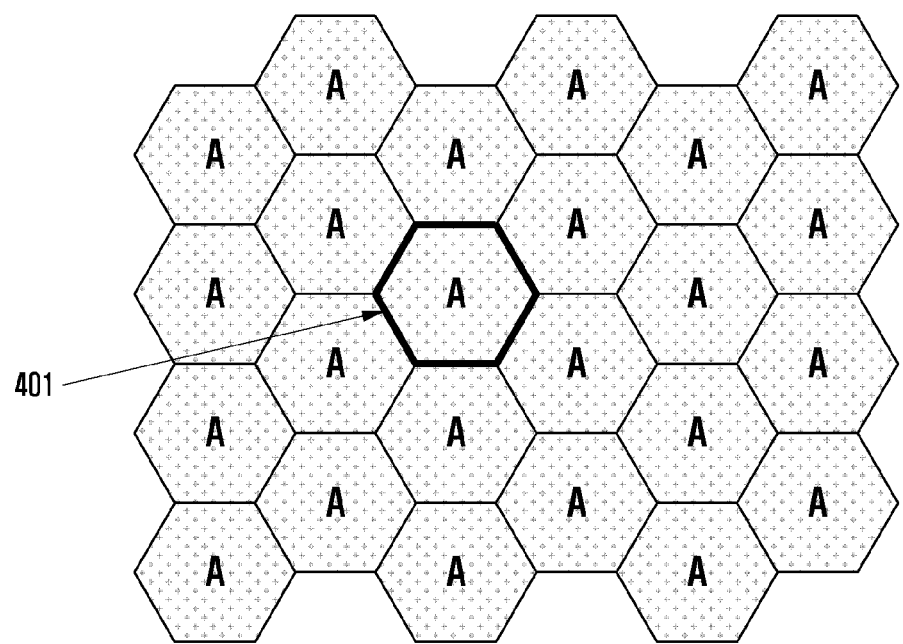
FIGS. 4A and 4B are diagrams for explaining an arrangement of prototype filters in a cellular network according to the present invention.
Figure 4B:
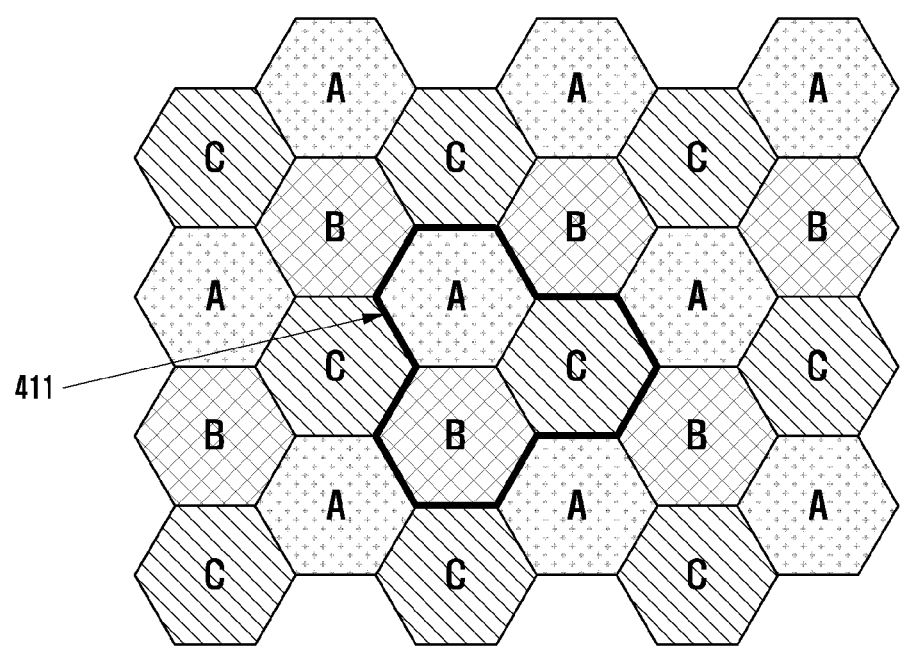

FIGS. 4A and 4B are diagrams for explaining an arrangement of prototype filters in a cellular network according to the present invention.

FIG. 4A depicts an exemplary cellular network using non-orthogonal filter sets. That is, all base stations of the cellular network may use the non-orthogonal filter sets. Assuming that there are N non-orthogonal filter sets from $P_1$ to $P_N$, all of the base stations of the cellular network may use the N non-orthogonal filter sets simultaneously. That is, while a cell 401 uses the N non-orthogonal filter sets $P_1$ to $P_N$, the other cells may use the N non-orthogonal filter sets $P_1$ to $P_N$ simultaneously. The non-orthogonal filter sets are used for allocating the resources to the terminals located within the near regions of the base stations.

FIG. 4B depicts an exemplary cellular network in which different orthogonal filter sets are used in the respective cells. As shown in FIG. 4B, three neighboring cells as denoted by reference number 411 may be allocated different orthogonal filter sets. For example, the cells A, B, and C forming the cluster 411 may be allocated different filter sets as exemplified in Table 1.

TABLE 1

| Filter set for cell A | Filter set for cell B | Filter set for cell C |
| --- | --- | --- |
| $P_{1,1,3}$ | $P_{1,2,3}$ | $P_{1,3,3}$ |
| ... | ... | ... |
| $P_{N,1,3}$ | $P_{N,2,3}$ | $P_{N,3,3}$ |

In Table 1, the first subscript of each filter set denotes the length of a filter for transmission/reception, the second subscript denotes the index of the selected orthogonal prototype filter, and the third subscript denotes the total number of prototype filters.

That is, the filter sets assignable within cells A, B, and C are organized as shown in Table 1 such that each cell uses the corresponding filter sets. And The filter sets assigned to cells A, B and C all have different filter set values. By configuring three neighboring cells to use different filter sets in this way, it may be possible to minimize interference among the neighboring cells in the cellular network deployed as shown in FIG. 4B. This configuration as described above may make it possible to improve the network throughput when it is applied to the terminals located within the far regions and not to the terminals within the near regions.

In the case of configuring the orthogonal filter sets as exemplified in FIG. 4B, it may be possible to use static prototype filters. In the case of using static prototype filters, it is not necessary to configure any inter-base station interface for information exchange. In the case of configuring static prototype filter sets, it may be possible to designate static prototype filter sets per base station with a frequency reuse factor and a cell identifier (ID). For example, it may be possible to determine candidate orthogonal filter sets based on the frequency reuse factor and select one of subset of the candidate orthogonal filter sets as the cell-specific orthogonal filter set based on the cell ID.

It may also be possible to apply the orthogonal filter subset to the resources or subframes assignable to cell edge terminals or small cell terminals. In this way, it may be possible to apply the present invention to a HetNet environment. A detailed description thereof is made hereinafter.

It may also be possible to determine the resources assignable to the cell edge terminals with a priority. In this case, the static resource allocation may cause throughput restriction, but it may contribute to the achievement of scheduling gain.

Hereinabove, the description has been made of the method for setting the static prototype filter sets in the cellular network with reference to FIGS. 4A and 4B. In the present invention, it may also be possible to configure semi-static or dynamic prototype filter sets as well as the static prototype filter sets for resource reuse. In the case of configuring the semi-static or dynamic prototype filter sets, it may be necessary for the base stations to exchange information. A description thereof is made with reference to FIG. 5.

Figure 5:
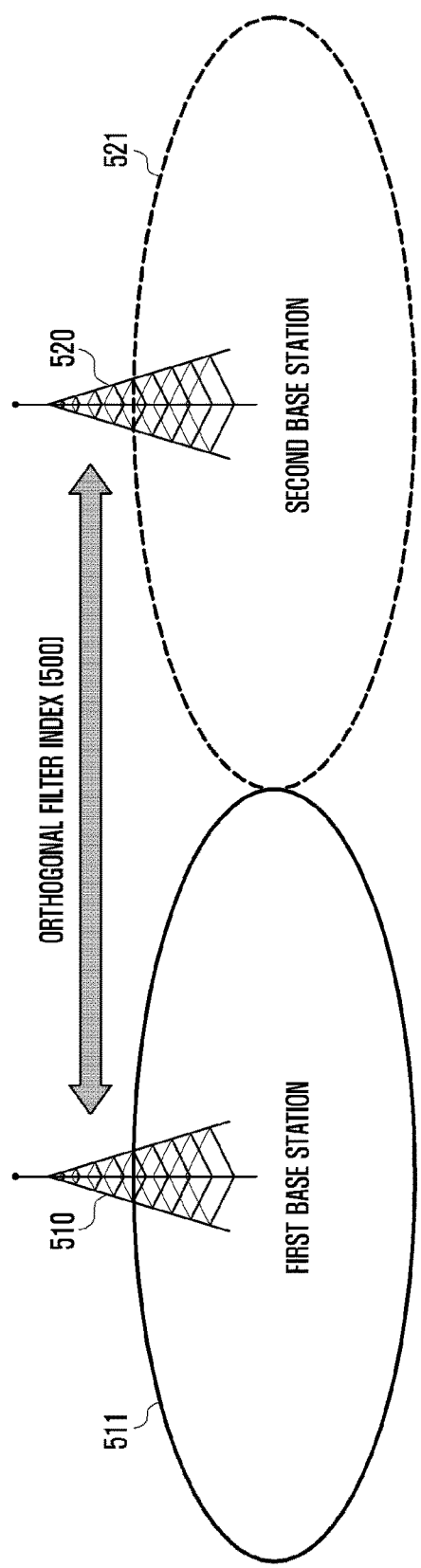
FIG. 5 is a diagram for explaining information exchange between base stations for configuring prototype filter sets semi-statically or dynamically according to the present invention.

FIG. 5 is a diagram for explaining information exchange between base stations for configuring prototype filter sets semi-statically or dynamically according to the present invention.

The first and second base stations 510 and 520 have the first and second base station coverage areas 511 and 521, respectively, and are neighbors to each other. The neighboring base stations have to use different orthogonal filter sets to minimize interference at their cell edges. For this reason, the first and second base stations 510 and 520 have to share the information on the orthogonal filter sets selected thereby. For this purpose, there is a need of a separate interface (not shown in FIG. 5) for information exchange between the base stations. For example, the interface for information exchange between the base stations may be an Operations, Administration, and Maintenance (OAM) interface of an X2 interface.

As described above, the first base station 510 may dynamically allocate resources to a terminal located at its cell edge. In the case of allocating one of the orthogonal prototype filter sets to a certain terminal, the first base station 510 has to send the second base station 520 an index of the selected orthogonal prototype filter set as denoted by reference number 500.

For example, if the first base station 510 selects one of the orthogonal filter sets available for cell A in Table 1, it sends an index of the selected filter set to the second base station 520. Then, the second base station 520 may select one of the orthogonal filter sets remaining after the filter set selection of the first base station 510 to allocate resources to the terminals located in its far region, i.e., cell edge. According to the previous example, the second base station 520 may select one of the filter sets assignable in cell B or cell C.

Here, the orthogonal filter indices information amount being exchanged between the base stations may be calculated by dividing the sum of the number of bits of the orthogonal prototype filter sets and the number of bits of the selected prototype filter set by resources (RB). Accordingly, if Fmax is 12, 8-bit information per resources (RB) or subframe is transmitted. In more detail, assuming that the maximum frequency reuse factor F is 3, the number of required orthogonal prototype filters may be expressed with 2 bits. Accordingly, the base stations may exchange 4-bit orthogonal prototype filter information comprised of 2-bit information indicating a prototype filter subset and 2-bit information indicating the prototype filter to be actually used.

By allocating resources comprised of a predetermined number of RB groups for cell edges or using per-subframe orthogonal prototype filters for a HetNet environment including small cells, it may be possible to minimize interference.

As described above, the number of orthogonal prototype filter subsets selected by a base station and the index of the orthogonal prototype filter selected in the filter set for actual use may be expressed by formula (2).

Prototype Foilter Subset=$P\{1, \ldots F\}, F$@Frequency Reuse Factor=$F$ $$\text{Prototype Foilter Index}=P\{1, \ldots N\},\{1, \ldots F\},F \quad (2)$$

Figure 6A:
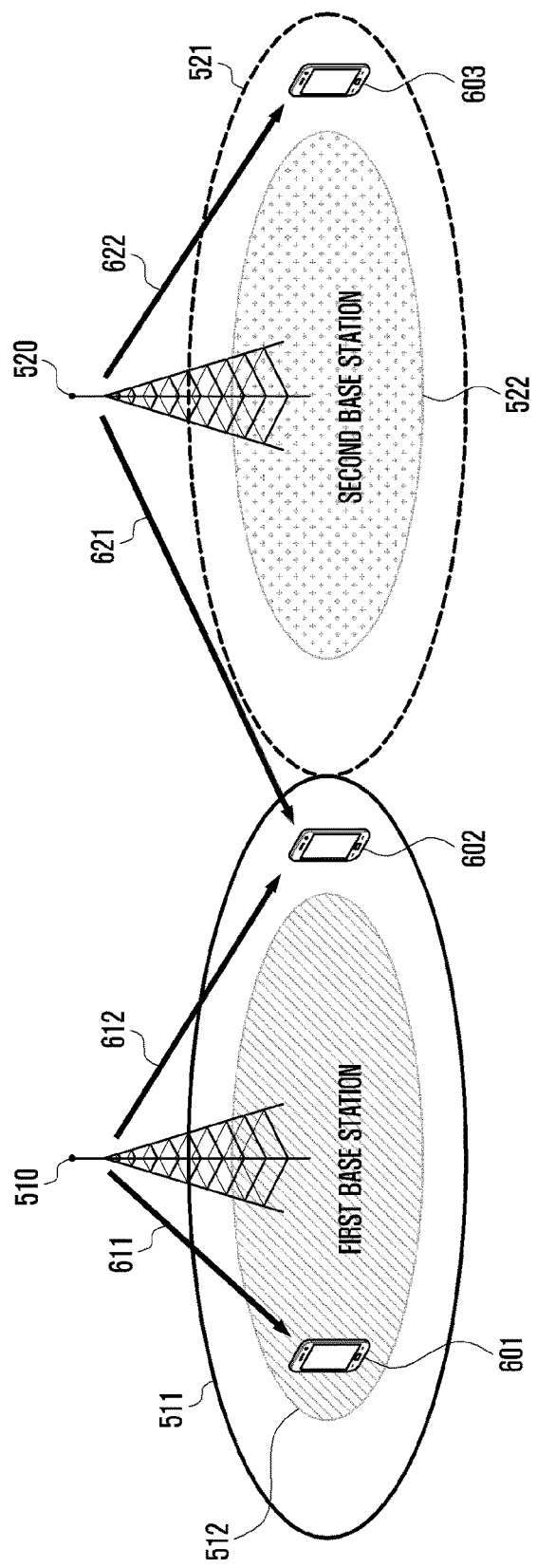
FIGS. 6A and 6B are diagrams for explaining downlink and uplink interference minimization according to the present invention.
Figure 6B:
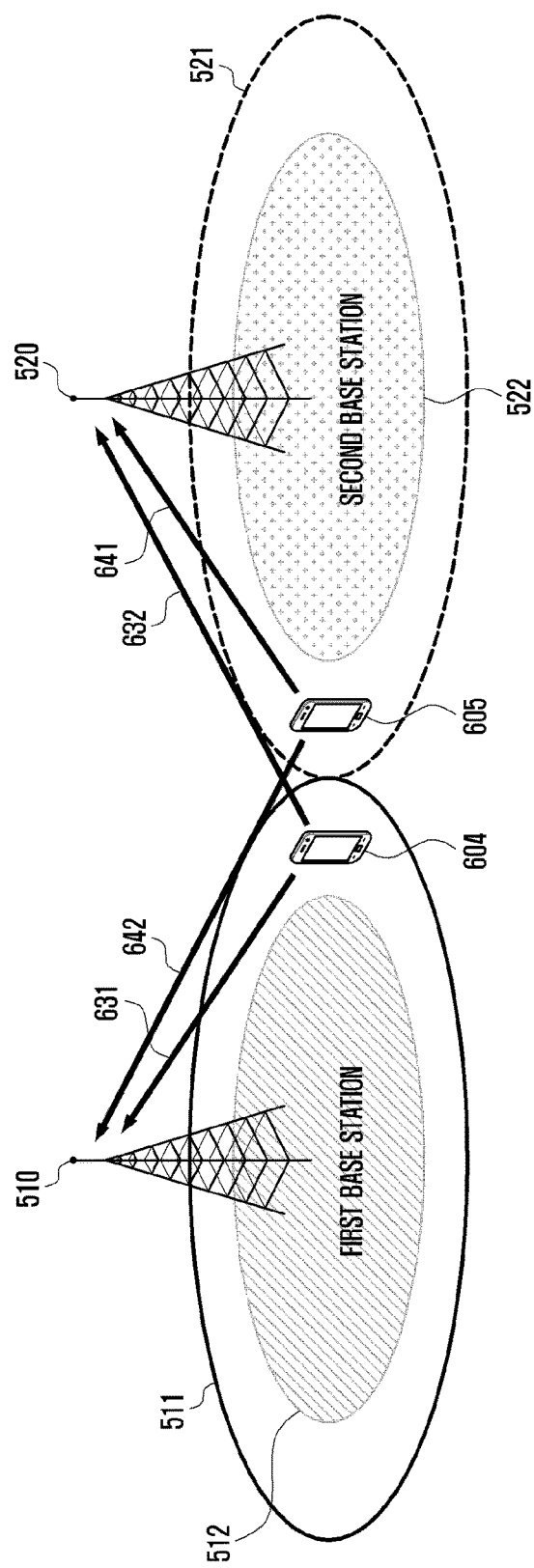

FIGS. 6A and 6B are diagrams for explaining downlink and uplink interference minimization according to the present invention.

First, the downlink interference minimization according to the present invention is described with reference to FIG. 6A. In FIG. 6A, the first and second base stations 510 and 520 and the first and second base station coverage areas 511 and 521 are referenced with the same reference numbers used in FIG. 5. The first base station 510 has the first base station coverage area 511 including a near region 512. The second base station 520 has the second base station coverage area 521 including a near region 522. It should be noted that the far region of each base station may be equivalent to a cell edge.

In FIG. 6A, a first terminal 601 is located in the near region 512 of the first base station 510, a second terminal 602 is located in the far region of the first base station coverage area 511 of the first base station 510, and a third terminal 603 is located within the far region of the second base station 520, notably, at a position free from the interference from the first base station 510.

In this situation, the first base station 510 may transmit data to the first terminal 601 through a first downlink channel 611. Here, since the first downlink channel 611 has a reach forming the near region of the first base station 510, it may be possible to use filters of a non-orthogonal prototype filter set. Accordingly, assuming that the channel between the first base station 510 and the first terminal 601 is $H_5$ and the data transmitted from the first base station 510 to the first terminal 601 is $X_3$, the signal transmitted by the first base station 510 through the first downlink channel 611 is received by the first terminal 601 in the form of "$H_5 \cdot P_m \cdot X_3$". Since there is no interference caused by a downlink channel of another base station, the signal is received by multiplying the filter $P_m$ selected between the first base station 510 and the first terminal 601.

The same principle may be applied to the case of the third terminal 603, which receives signals from the second base station 520. Suppose that the channel between the second base station 520 and the third terminal 603 is $H_2$ and the data being transmitted from the second base station 520 to the third terminal 603 is $X_2$. Also, suppose that a filter for use between the second base station 520 and the third terminal 603 is selected from $P_{n,2,3}$ among the orthogonal prototype filter sets. Then, the signal transmitted by the second base station 520 through the fourth downlink channel 622 is received by the third terminal 603 in the form of "$H_2 \cdot P_{n,2,3} \cdot X_2$".

In the case of receiving certain data through the downlink channel 612 from the first base station 510, however, the second terminal 602 experiences interference of the data transmitted from the second base station 520 to the third terminal 603. Suppose that the channel between the second terminal 602 and the first base station 510 is $H_1$ and the first base station 510 transmits to the second terminal 602 the data $X_1$ with $P_{m,1,3}$ selected among the orthogonal prototype filter sets. Then, the signal transmitted by the first base station 501 through the second downlink channel 612 is received by the second terminal in the form of "$H_1 \cdot P_{m,1,3} \cdot X_1$". Also, the second terminal 602 may also receive the signal transmitted through the channel $H_3$ from the second base station 520 to the third terminal 603. Then the signal transmitted by the second base station 520 is received by the second terminal 602 in the form of "$H_3 \cdot P_{n,2,3} \cdot X_2$".

However, the base stations use the orthogonal filters for their far regions as described above such that the terminal being served by one base station cancels the signals transmitted by other base stations. That is, the terminals located within the far regions of their serving cells may ignore or cancel the interference from the neighboring cells using the filters selected from different orthogonal prototype filter sets.

The uplink interference minimization according to the present invention is described with reference to FIG. 6B. In FIG. 6B, the first and second base stations 510 and 520 and the first and second base station coverage areas 511 and 521 are referenced with the same reference numbers used in FIG. 5. The first base station 510 has the first base station coverage area 511 including a near region 512. The second base station 520 has the second base station coverage 521 including a near region 522.

In FIG. 6B, a fourth terminal 604 is located within the far region of the first base station coverage area 511 of the first base station 510, close to the second base station 520. A fifth terminal 605 is located within the far region of the second base station 520, close to the first base station 510.

The fourth terminal 604 may transmit data to the first base station 510 through a first uplink channel 631. Since the first uplink channel 631 has a reach from the far region of the first base station 510 to the first base station 510, the fourth terminal 604 may transmit data with a filter selected from one of the orthogonal prototype filter sets. Accordingly, assuming that the uplink channel between the first base station 510 and the fourth terminal 604 is $H_1$, the data transmitted from the fourth terminal 604 to the first base station 510 is $X_1$, and the selected prototype filter set is $P_{m,1,3}$, then the signal transmitted through the first uplink channel 631 from the fourth terminal 604 is received by the first base station 510 in the form of "$H_1 \cdot P_{m,1,3} \cdot X_1$".

Also, assuming that the uplink channel between the second base station 520 and the fifth terminal 605 is $H_2$, the data transmitted from the fifth terminal 605 to the second base station 520 is $X_2$, and the selected prototype filter set is $P_{n,2,3}$, then the signal transmitted by the fifth terminal 605 through the second uplink channel 641 is received by the second base station 520 in the form of "$H_2 \cdot P_{n,2,3} \cdot X_2$".

However, the first base station 510 may receive data transmitted through the fourth uplink channel 642 from the fifth terminal 650 located within the far region of the second base station 520 as well as the data from the fourth terminal 604 being served by the first base station 510. Assuming that the channel from the fifth terminal 605 to the first base station 510 is $H_3$, the signal transmitted by the fifth terminal 605 through the fourth uplink channel 642 is received by the first base station 510 in the form of "$H_3 \cdot P_{n,2,3} \cdot X_2$" along with the signal transmitted through the first uplink channel 631 from the fourth terminal 604.

Also, the second base station 520 may receive the data transmitted by the fourth terminal 604 located within the coverage area of the first base station 510 through the third uplink channel 632. Assuming that the channel between the fourth terminal 604 and the second base station 520 is $H_4$, the second base station 520 receives the signal "$H_4 \cdot P_{m,1,3} \cdot X_1$" transmitted by the fourth terminal 605 through the third uplink channel 632 along with the signal transmitted by the fifth terminal 605 through the second uplink channel 641.

Since the first and second base stations 510 and 520 use orthogonal filter sets as described above, it is possible to remove the signals transmitted by other base stations with different filter sets from the target signals. It may also be possible to ignore or minimize the interference caused by the uplink signals from the terminals being served by other base stations.

Figure 7:
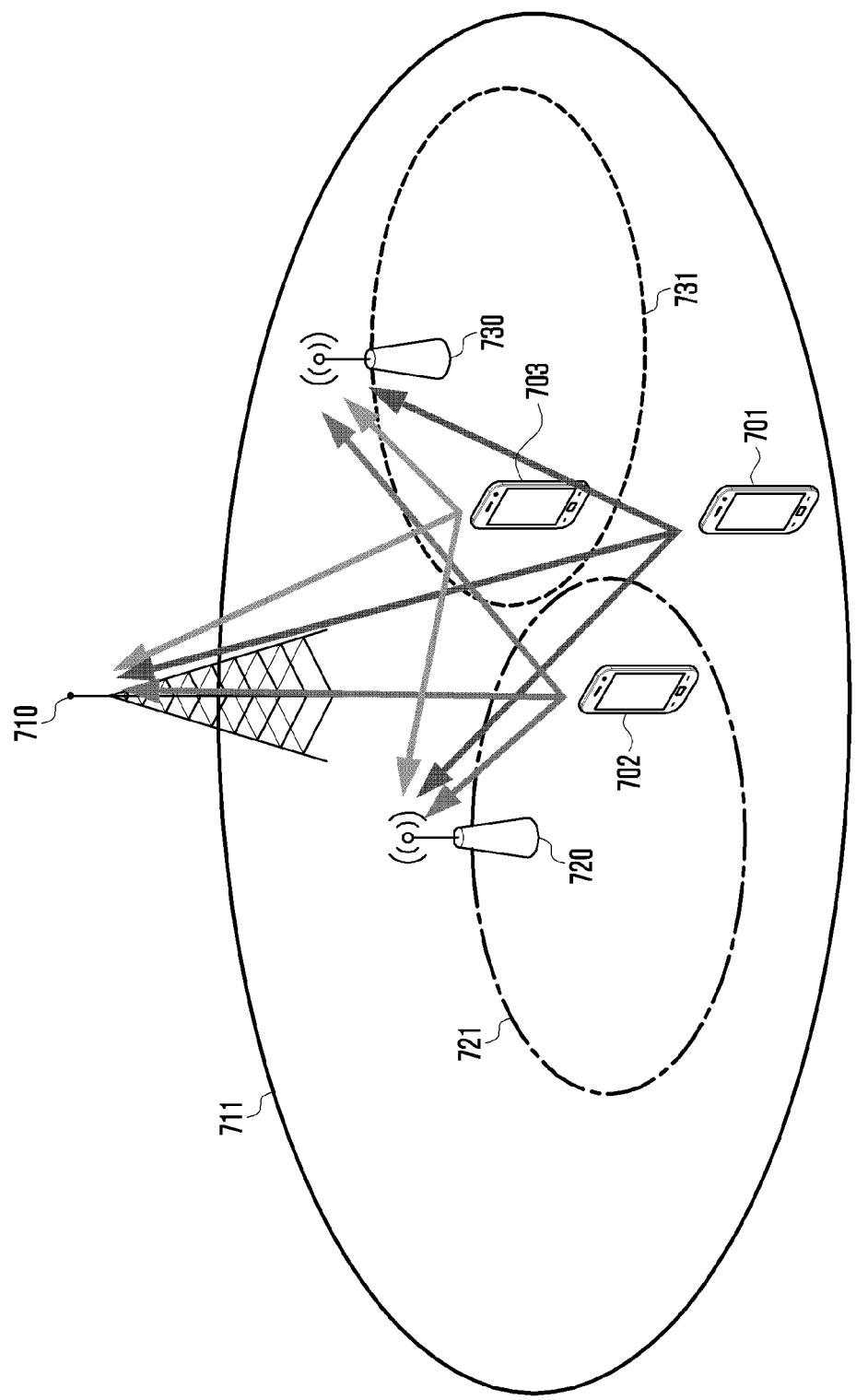
FIG. 7 is a diagram illustrating a HetNet for explaining a case of applying the resource allocation scheme of the present invention to the HetNet.

FIG. 7 is a diagram illustrating a HetNet for explaining a case of applying the resource allocation scheme of the present invention to the HetNet.

In reference to FIG. 7, a macro base station 710 forms a macro cell 711 in which first and second small base stations 720 and 730 are deployed. The first and second small base stations 720 and 730 form first and second small cells 721 and 731, respectively, in the macro cell 711.

In FIG. 7, a first terminal 701 is being served by the macro base station 710, a second terminal 702 is being served by the first small base station 720, and a third terminal 703 is being served by the second small base station 730. In the situation where the first terminal 701 is located within the macro cell 711 but not within any small cell and the second and third terminals 702 and 703 are respectively located within the first and second small cells 721 and 731 formed in the macro cell 711, it is difficulty to apply the above described interference reduce method dynamically.

The above-described methods are directed to canceling interference in uplink and downlink in a situation where the cells similar or equivalent to each other in size are deployed without being overlapped rather than the HetNet situation. Accordingly, there is a need of a method for performing interference control and resource allocation dynamically in a HetNet situation as depicted in FIG. 7.

FIG. 8A is a diagram illustrating data communication using filter sets according to the present invention.

In reference to FIG. 8A, a receiver is receiving signals from three different cells. The first cell transmitter (Cell 1_Tx) 800_1 may be equivalent to the first cell (cell 1) of FIG. 1 or the cells transmitting the same signals as the first cell in FIG. 4B. Also, the second transmitter (Cell 2_Tx) 800_2 may be equivalent to the second cell (cell 2) of FIG. 1 or the cells transmitting the same signal as the second cell in FIG. 4B, and the third transmitter (Cell 3_Tx) 800_3 may be equivalent to the third cell (cell 3) of FIG. 1 or the cells transmitting the same signals as the third cell in FIG. 4B.

The receiver 900 may be a terminal located at a cell edge of one of the first to third cells. In the following description, it is assumed that the receiver 900 is located at the cell edge of the first cell and receiving data through the first cell.

As described above, the transmitters 800_1, 800_2, and 800_3 of the first cell (Cell 1), the second cell (Cell 2), and the third cell (Cell 3) may transmit different signals. If the transmitters 800_1, 800_2, and 800_3 of the first cell (Cell 1), the second cell (Cell 2), and the third cell (Cell 3) transmit different signals, the receiver 900 receives the signals through a channel 850. In this case, the desired signal of the receiver 900 is the signal transmitted by the first cell transmitter 800_1, and the signals transmitted by the second and third cell transmitters 800_2 and 800_3 may be regarded as interference.

In this situation, it is assumed that the receiver 900 and the first cell transmitter 800_1 share the information on the prototype filter to be used therebetween. At this time, the first transmitter 800_1 uses an orthogonal prototype filter for transmitting data to the receiver 900. The receiver 900 receives the signal which the second cell transmitter 800_2 has transmitted using an orthogonal prototype filter and the signal which the third cell transmitter 800_3 has transmitted using another orthogonal prototype filter. Here, the first cell transmitter 800_1, the second cell transmitter 800_2, and the third cell transmitter 800_3 use different orthogonal prototype filter sets. The detailed description thereof has been already described above and thus is omitted herein.

In the case that the first cell transmitter 800_1, the second cell transmitter 800_2, and the third cell transmitter 800_3 transmit different orthogonal prototype filter sets, the receiver 900 may receive the desired signal transmitted by the first cell transmitter 800_1 using the orthogonal prototype filter agreed for use in the first cell. The first cell transmitter 800_1, the second cell transmitter 800_2, and the third transmitter 800_3 are configured in the same way with the exception that they use different orthogonal prototype filter sets.

If a certain base station selects an orthogonal prototype filter set or a filter from the filter set, it may transmit the information on the selected filter set or the selected filter to the neighboring base stations. The base stations may communicate through a dedicated interface, which has been well-known and thus a detailed description thereof is omitted herein.

A description is made of the transmitter according to the present invention with reference to the accompanying drawings. In the following description, the transmitter may be base stations communicating through a dedicated interface. However, it should be noted that the inter-base station interfaces are not depicted in the drawings.

Figure 8B:
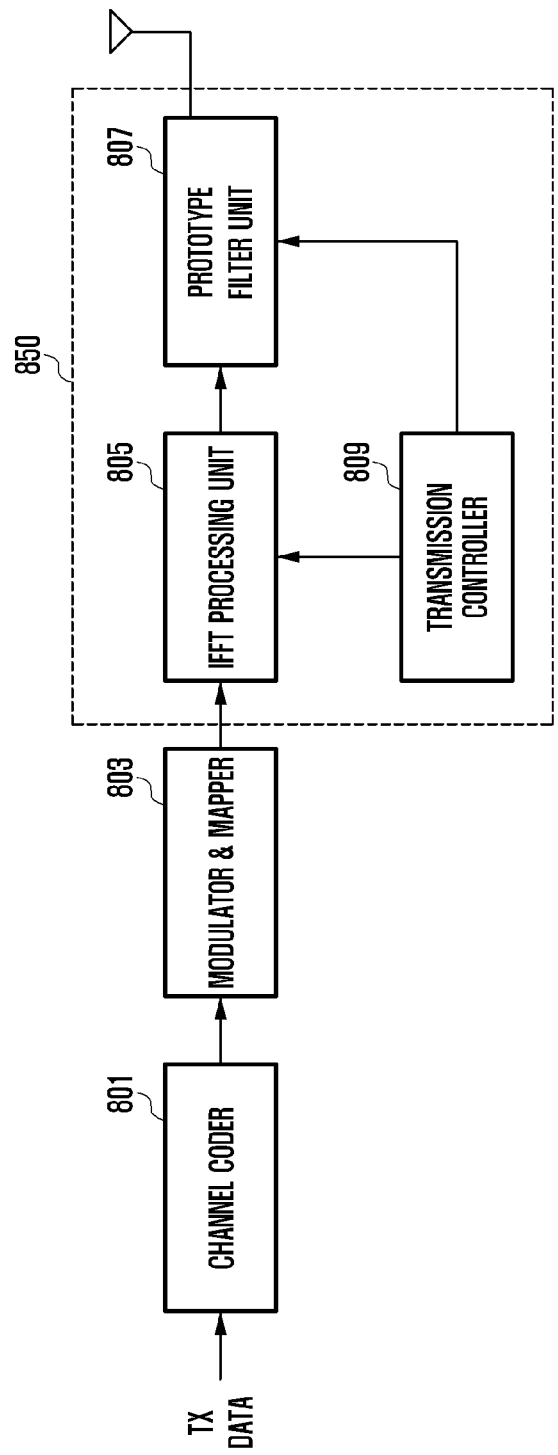
FIG. 8B is a block diagram illustrating a configuration of a transmitter for transmitting data with a filter set according to an embodiment of the present invention.

FIG. 8B is a block diagram illustrating a configuration of a transmitter for transmitting data with a filter set according to an embodiment of the present invention.

Before starting the description with reference to FIG. 8B, it should be noted that the first cell transmitter 800_1, the second transmitter 800_2, and the third transmitter 800_3 may have the same configuration as described with reference to FIG. 8A.

The transmit data is input to a channel encoder 801 to be channel-coded in a coding scheme preconfigured in the wireless communication system. The channel-coded data (or symbol) is input to a modulator & mapper 803. The modulator & mapper 803 performs modulation and mapping on the channel-coded data (symbol) using a modulating scheme determined based on the channel condition with a receiver and outputs the result signal to a transmission filter determination unit 850. According to the first embodiment of the present invention, the transmission filter determination unit 850 may be comprised of an IFFT processing unit 805, a prototype filter unit 807, and a transmission controller 809. The IFFT processing unit 805 of the transmission filter determination unit 850 may perform Inverse Fast Fourier Transform (IFFT) on the modulated and mapped data (or symbol) and output the conversion result to the prototype filter unit 807.

The prototype filter unit 807 may use non-orthogonal filter sets for resource allocation to the terminals located within a non-cell edge area and orthogonal filter sets for resource allocation to the terminal located within a cell edge area. The transmission controller 809 may determine a filter set to be applied to the prototype filter unit 807. For example, it may be possible to apply an orthogonal filter set for data transmission to the terminals located in the cell edge area and a non-orthogonal filter set for data transmission to the terminals located in the cell center area.

For example, it may be possible to select one of two or more filter sets based on the frequency reuse factor. The transmission controller 809 may control to transmit and receive selected prototype filter information to and from other base stations through an inter-base station interface (not shown in FIG. 8B). The transmission controller 809 may exclude the orthogonal prototype filters selected by other base stations, the orthogonal prototype filters being indicated in the selected prototype filter information received from the other base stations, from the candidate filters available for use in communication with a terminal and determine an orthogonal prototype filter for use in communication with a cell edge terminal. At this time, the transmission controller 809 may select one of the filters included in the orthogonal prototype filter set. The transmission controller 809 may also select at least one orthogonal prototype filter based on the cell identifier information. The detailed description thereof has been made with reference to FIGS. 4A and 4B and thus is omitted herein. It may also be possible for the network operator to select an orthogonal prototype filter set and configure the base station to use the selected filter set. Also, the orthogonal prototype filter may be selected according to the procedure of the control flowchart to be described later. The prototype filter unit 807 may select a prototype filter based on the selected filter information provided by the transmission controller 809. The transmission controller 809 may be included in the transmission filter determination unit 850 and act as a controller for controlling the overall operations of the transmitter.

The prototype filter unit 807 may perform filtering on the input data using the selected prototype filter. The data filtered through the prototype filter unit 815 is input to the IFFT processing unit 817. The IFFT processing unit 817 may perform IFFT on the filtered data and transmit the IFFT-ed data to the terminal.

Figure 8C:
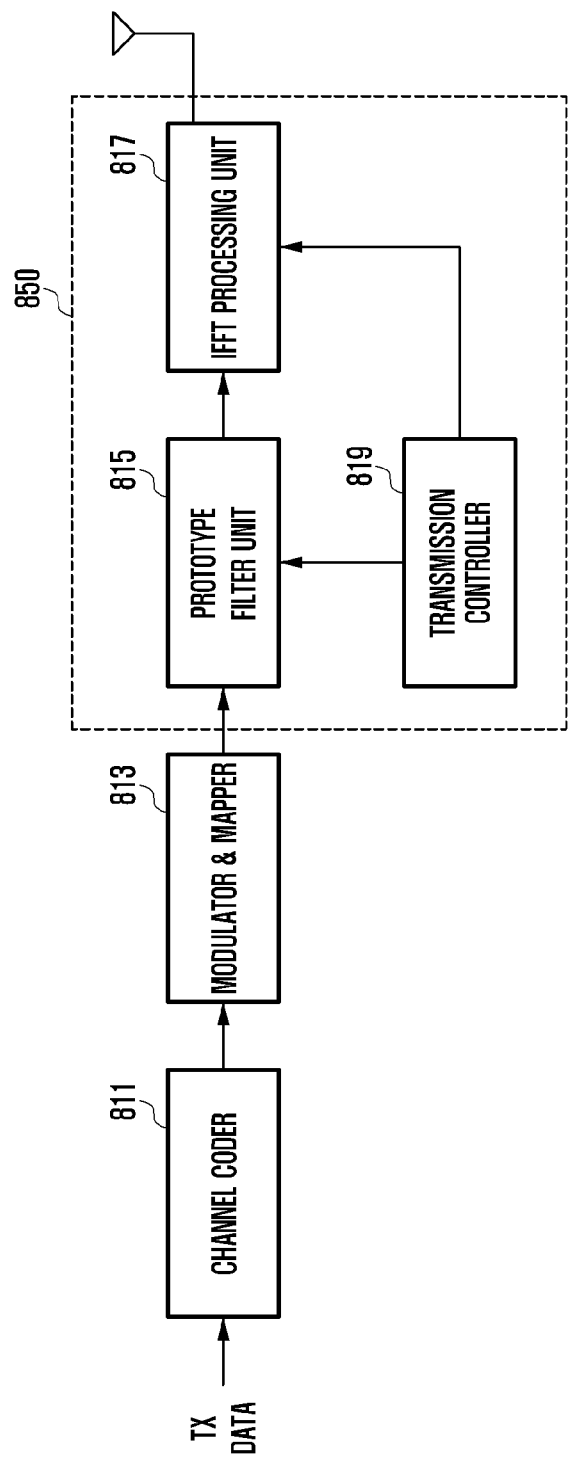
FIG. 8C is a block diagram illustrating a configuration of a transmitter for transmitting data with a filter set according to another embodiment of the present invention.

FIG. 8C is a block diagram illustrating a configuration of a transmitter for transmitting data with a filter set according to another embodiment of the present invention.

The transmit data is input to a channel encoder 811 to be channel-coded in a coding scheme preconfigured in the wireless communication system. The channel-coded data (or symbol) is input to a modulator & mapper 813. The modulator & mapper 813 performs modulation and mapping on the channel-coded data (symbol) using a modulating scheme determined based on the channel condition with a receiver and outputs the result signal to a transmission filter determination unit 850.

According to a second embodiment of the present invention, the transmission filter determination unit 850 may include a prototype filter unit 815, an IFFT processing unit 817, and a transmission controller 819. The prototype filter unit 815 of the transmission filter determination unit 850 applies a prototype filter to the modulated and mapped data (or symbol) and outputs the result signal to the IFFT processing unit 817. As described above, the prototype filter unit 815 may use a non-orthogonal filter set for the terminals located in the non-cell edge area and an orthogonal filter set for the terminals located in the cell edge area.

The transmission controller 819 may determine a filter set to be applied to the prototype filter unit 815. For example, it may be possible to select one of two or more filter sets based on the frequency reuse factor. The transmission controller 819 may control to transmit and receive selected prototype filter information to and from other base stations through an inter-base station interface (not shown in FIG. 8C). The transmission controller 819 may exclude the orthogonal prototype filters selected by other base stations, the orthogonal prototype filters being indicated in the selected prototype filter information received from the other base stations, from the candidate filters available for use in communication with a terminal and determine an orthogonal prototype filter for use in communication with a cell edge terminal. At this time, the transmission controller 819 may select at least one of the filters included in the orthogonal prototype filter set based on the cell identity information. The detailed description thereof has been made with reference to FIGS. 4A and 4B and thus is omitted herein. It may also be possible for the network operator to select an orthogonal prototype filter set and configure the base station to use the selected filter set according to the procedure of the control flowchart to be described later. The prototype filter unit 815 may select a prototype filter based on the selected filter information provided by the transmission controller 819. The transmission controller 819 may be included in the transmission filter determination unit 850 and act as a controller for controlling the overall operations of the transmitter.

The prototype filter unit 815 may perform filtering on the input data using the selected prototype filter. The data filtered through the prototype filter unit 815 is input to the IFFT processing unit 817. The IFFT processing unit 817 may perform IFFT on the filtered data and transmit the IFFT-ed data to the terminal.

The transmitters of FIGS. 8B and 8C are configured identically with the exception that the positions of the prototype filter unit and the IFFT processing unit are changed. Although the positions of the prototype filter unit and IFFT processing unit are changed, the configurations of FIGS. 8B and 8C result in the same outcome. However, the receivers for communication with the transmitters configured as shown in FIGS. 8B and 8C should be configured correspondingly. Descriptions are made of the receivers corresponding to the transmitters configured as shown in FIGS. 8B and 8C hereinafter with reference to the accompanying drawings.

Figure 9A:
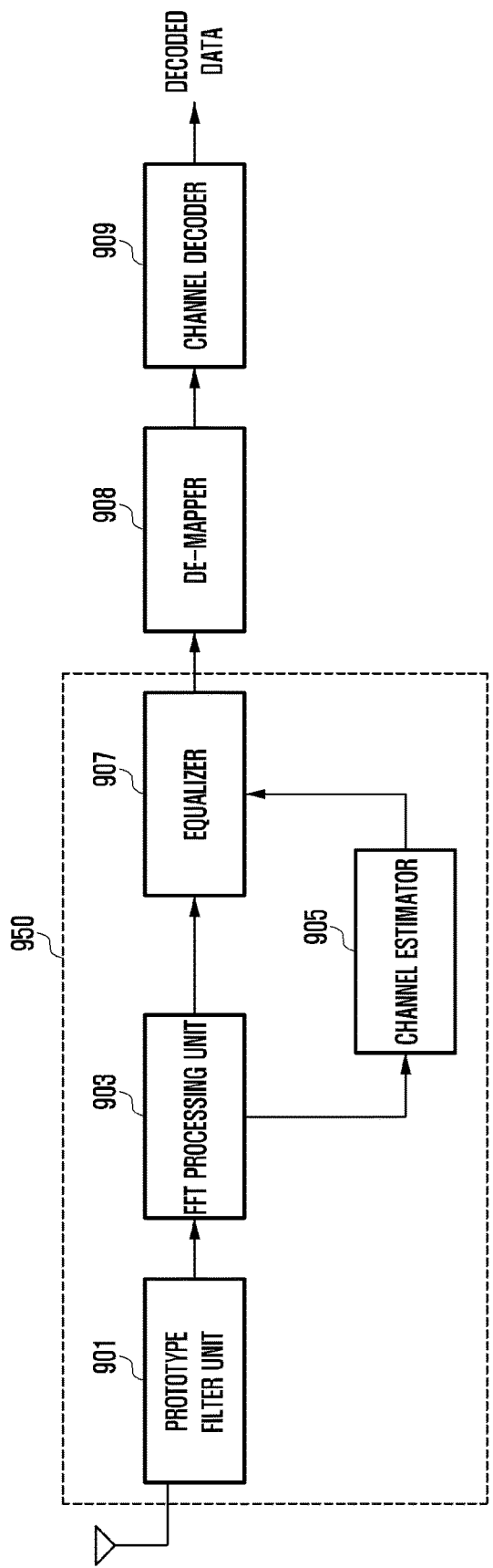
FIG. 9A is a block diagram illustrating a configuration of a receiver for receiving data with a filter set according to an embodiment of the present invention.

FIG. 9A is a block diagram illustrating a configuration of a receiver for receiving data with a filter set according to an embodiment of the present invention. It should be noted that FIG. 9A depicts a receiver corresponding to the transmitter having the transmission filter determination unit 850 configured as shown in FIG. 8B. Although not shown in FIG. 9A, the receiver may have a reception controller for controlling other components and, in particular, generating a signal indicating a filter for use by a prototype filter unit 901.

According to the first embodiment of the present invention, the channel reception unit 950 may include a prototype filter unit 901, an FFT processing unit 903, an equalizer 907, and a channel estimation unit 905, as shown in FIG. 9A. A signal transmitted by a transmitter is received by an antenna and then input to the prototype filter unit 901. The prototype filter unit 901 may be configured to receive the signals transmitted by two, three, or more cells, i.e., multiple cells. The following description is directed to a case where the receiver receives signals from three different cells as assumed in FIG. 8A, for convenience of explanation.

For example, the receiver receives the signals transmitted by the first cell transmitter 800_1, the second cell transmitter 800_2, and the third cell transmitter 800_3 through a channel established therebetween.

Assuming that the signal transmitted by the first cell transmitter 800_1 is S1 and the channel between the first cell transmitter 800_1 and the receiver 900 is H1, the signal received from the first cell transmitter 800_1 may be expressed as "S1×H1". Assuming that the signal transmitted by the second cell transmitter 800_2 is S2 and the channel between the second cell transmitter 800_2 and the receiver 900 is H2, the signal received from the second cell transmitter 800_2 may be expressed as "S2×H2". By the same principle, assuming that the signal transmitted by the third cell transmitter 800_3 is S3 and the channel between the third cell transmitter 800_3 and the receiver 900 is H3, the signal received from the third cell transmitter 800_3 may be expressed as "S3×H3".

Accordingly, if the receiver 900 receives signals from three difference cells, this means that it receives a mixture of the signals transmitted by the three cells, i.e., "S1×H1+S2×H2+S3×H3".

The prototype filter unit 901 applies a predetermined orthogonal prototype filter to the received signals to remove the signals with the exception of the desired signal. If the desired signal is the signal transmitted by the first cell transmitter 800_1, it may be possible for the receiver 900 to remove the signals transmitted by the second and third cell transmitters 800_2 and 800_3 by applying the orthogonal prototype filter agreed with the first cell transmitter 800_1.

The signal filtered through the prototype filter unit 901 is input to the FFT processing unit 803, which outputs an FFT-ed symbol. The FFT-ed symbol passes the channel estimation unit 905 and the equalizer 907 sequentially. The channel estimation unit 905 may perform channel estimation on the FFT-ed signal. The channel estimation is made to find H1 for extracting the desired signal as described above. The channel estimation unit 905 generates estimated channel information to the equalizer 907. The equalizer 907 may perform equalization on the FFT-ed symbol using the estimated channel information.

The equalized symbol is input to the de-mapper 908, which inversely performs the mapping process of the transmitter to recover the data. The recovered data (or symbol) is input to the channel decoder 909, which performs channel decoding on the data.

Figure 9B:
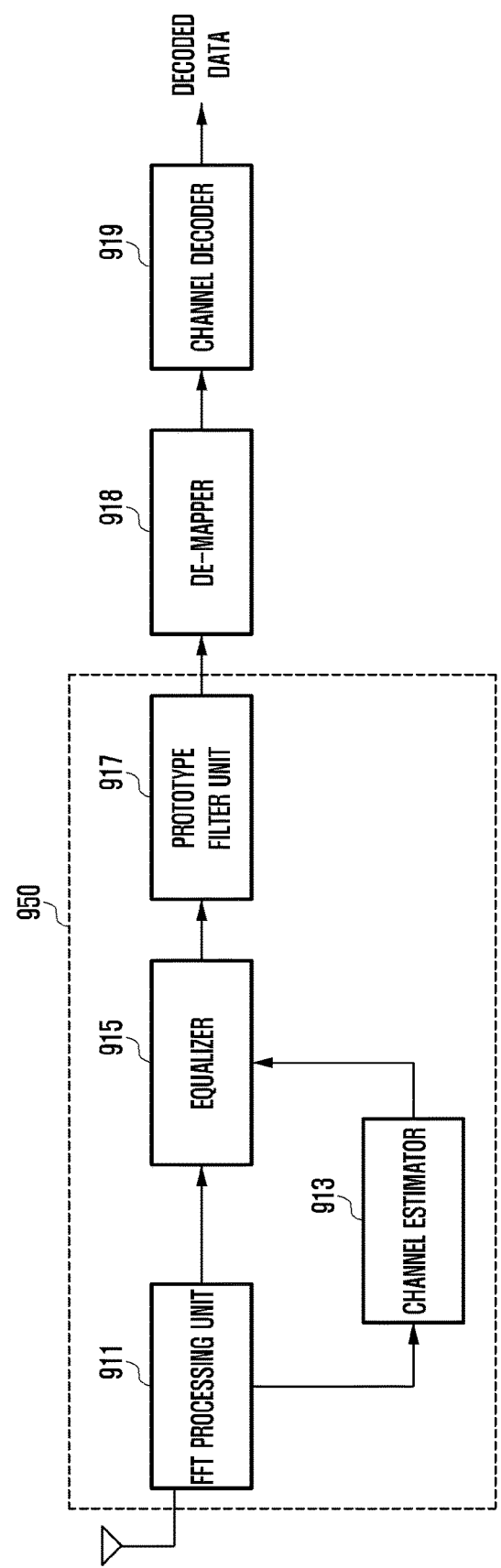
FIG. 9B is a block diagram illustrating a receiver for receiving data with a filter set according to another embodiment of the present invention.

FIG. 9B is a block diagram illustrating a receiver for receiving data with a filter set according to another embodiment of the present invention.

Before starting the description with reference to FIG. 9B, it should be noted that FIG. 9B depicts a receiver corresponding to the transmitter having the transmission filter determination unit 850 configured as shown in FIG. 8C. Although not shown in FIG. 9B, the receiver may have a reception controller for controlling other components and, in particular, generating a signal indicating a filter for use by a prototype filter unit 917.

According to the second embodiment of the present invention, the channel reception unit 950 may include an FFT processing unit 911, an equalizer 915, a prototype filter unit 917, and a channel estimation unit 913, as shown in FIG. 9B. A signal is received by an antenna and then input to the FFT processing unit 911 of the channel reception unit 950. The FFT processing unit 911 performs FFT on the input signal to output an FFT-ed signal. The FFT-ed signal passes through the channel estimation unit 913 and the equalizer 915. The channel estimation unit 913 estimates channels from the respective transmitter and provides the equalizer 915 with estimated channel information. The equalizer 915 performs equalization on the FFT-ed data (or symbol) using the estimated channel information and outputs the equalized data.

The equalizer 915 outputs the equalized data (or symbol) to the prototype filter unit 917. The prototype filter unit 917 may be configured to receive the signals transmitted by two, three, or more cells, i.e., multiple cells, as described above. The following description is directed to a case where the receiver receives signals from three different cells as assumed in FIG. 8A, for convenience of explanation.

For example, the receiver receives the signals transmitted by the first cell transmitter 800_1, the second cell transmitter 800_2, and the third cell transmitter 800_3 through a channel established therebetween.

In this case, the signals may be received in similar patterns to those as described with reference to FIG. 9A. That is, assuming that the signal transmitted by the first cell transmitter 800_1 is S1 and the channel between the first cell transmitter 800_1 and the receiver 900 is H1, the signal received from the first cell transmitter 800_1 may be expressed as "S1×H1". Assuming that the signal transmitted by the second cell transmitter 800_2 is S2 and the channel between the second cell transmitter 800_2 and the receiver 900 is H2, the signal received from the second cell transmitter 800_2 may be expressed as "S2×H2". By the same principle, assuming that the signal transmitted by the third cell transmitter 800_3 is S3 and the channel between the third cell transmitter 800_3 and the receiver 900 is H3, the signal received from the third cell transmitter 800_3 may be expressed as "S3×H3".

Accordingly, if the receiver 900 receives signals from three difference cells, this means that it receives a mixture of the signals transmitted by the three cells, i.e., "S1×H1+S2×H2+S3×H3".

The prototype filter unit 917 applies a predetermined orthogonal prototype filter to the received signals to remove the signals with the exception of the desired signal. If the desired signal is the signal transmitted by the first cell transmitter 800_1, it may be possible for the receiver 900 to remove the signals transmitted by the second and third cell transmitters 800_2 and 800_3 by applying the orthogonal prototype filter agreed with the first cell transmitter 800_1.

The data (or symbol) filtered through the prototype filter unit 917 is input to the de-mapper 908, which inversely performs the mapping process of the transmitter to recover the data. The recovered data (or symbol) is input to the channel decoder 919, which performs channel decoding on the data and outputs the channel-decoded data.

The receivers configured as shown in FIGS. 9A and 9B may correspond to the transmitters configured as shown in FIGS. 8B and 8C, respectively. That is, a receiver may be configured as shown in FIG. 9A or 9B depending on the configuration of the transmitter.

Figure 10:
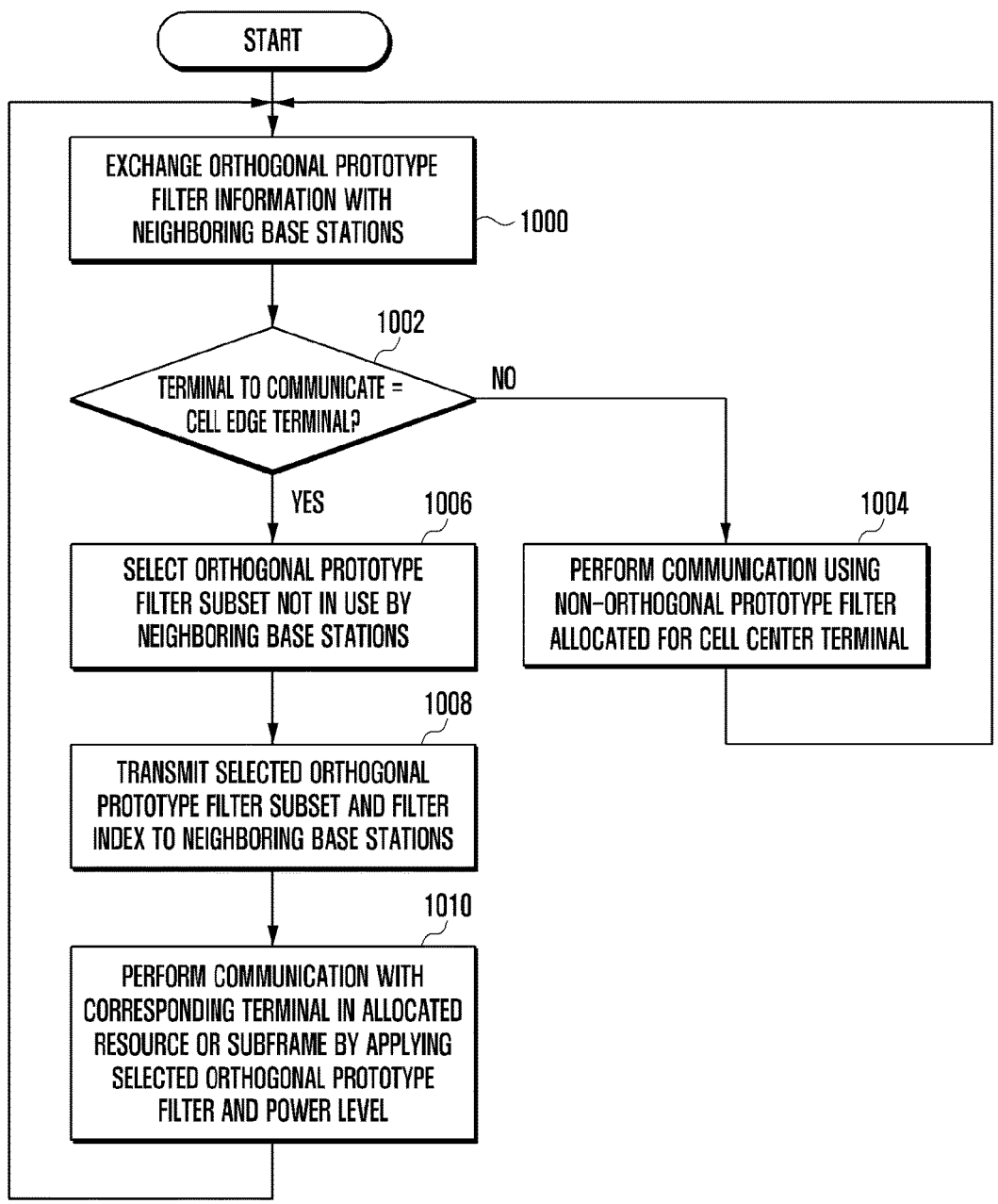
FIG. 10 is a flowchart illustrating a prototype filter selection procedure of a base station according to an embodiment of the present invention.

FIG. 10 is a flowchart illustrating a prototype filter selection procedure of a base station according to an embodiment of the present invention.

The procedure of FIG. 10 is described with the reference numbers used in FIG. 8B. However, it is obvious to those in the art that the embodiment of FIG. 10 is applicable to the case of using the receiver configured as shown in FIG. 8C. The control operation of FIG. 10 may be performed by a scheduler of a base station or the transmission controller 809 of FIG. 8B or the transmission controller 819 of FIG. 8C. The following description is made with the assumption of the operation of the transmission controller 809 of FIG. 8B for convenience of explanation.

The transmission controller 809 controls to exchange orthogonal prototype filter information with neighboring base stations at step 1000. The orthogonal prototype filter information may be exchanged through an inter-base station interface (not shown in FIGS. 8B and 8C). In order to receive the orthogonal prototype filter information from the neighboring base stations, it may be necessary to receive per-resource block or per-subframe orthogonal prototype filter allocation information. The transmission controller 809 may control to receive the orthogonal prototype filter allocation information from the neighboring base stations and to transmit to the neighboring base stations the information on the prototype filters which it has allocated to terminal(s). The detailed description thereof has been made with reference to FIG. 5 and thus is omitted herein.

Next, the transmission controller 809 may detect a necessity of communication with a terminal and determine at step 1002 whether the terminal is a cell edge terminal. It may be possible to discover a cell edge terminal in various ways. For example, it may be possible to determine a terminal as a cell edge terminal in the case of receiving from the terminal a report indicating that the received signal strength is equal to or less than a predetermined value, a report of the signal receipt from a neighboring base station, or coordinate information acquired from a satellite signal. If a new cell edge terminal discovery method is developed in the future, it can be used in the present invention. It should be noted that the present invention is not limited by specific cell edge terminal discovery methods.

If it is determined at step 1002 that the terminal is a cell edge terminal, the procedure goes to step 1006; otherwise if the terminal is a cell center terminal, the procedure goes to step 1004.

At step 1004, the transmission controller 809 controls to allocate a non-orthogonal prototype filter to the cell center terminal and communicate with the corresponding terminal using the non-orthogonal prototype filter. That is, the transmission controller 809 generates a non-orthogonal prototype filter selection signal to the prototype filter unit 807. In this way, it may be possible to communicate with the cell center terminal using a non-orthogonal prototype filter. The description of the non-orthogonal prototype filter has been already made with reference to FIGS. 3 and 4A and thus is omitted herein.

At step 1006, the transmission controller 809 selects an orthogonal prototype filter subset not in use by neighboring base stations based on the information received at step 1000 for communication with the cell edge terminal. The reason of selecting an orthogonal prototype filter subset is to minimize the interference caused by the signals transmitted by the neighboring base stations because the cell edge terminal may receive signals transmitted by neighboring base stations. Next, at step 1008 the transmission controller 809 transmits to the neighboring base stations an index indicating the selected orthogonal prototype filter subset and the prototype filter. The operation of step 1008 is required for prohibiting the neighboring base stations from using the prototype filter selected for communication with the corresponding terminal.

After transmitting the index of the prototype filter subset and prototype filter selected for communication with the corresponding terminal to the neighboring base stations, the transmission controller 809 may control to communicate with the corresponding terminal by applying the selected orthogonal prototype filter and power level at the resources or subframes allocated to the corresponding terminal at step 1010.

A base station has to allocate frequency resources such as subframes (or code resources in a certain system) as well as filter resources for communication with a certain terminal. Also, the base station has to select a suitable transmit power level based on the distance from the terminal to communicate and the channel condition. The operation of step 1010 includes applying the suitable power level on the allocated resources. The allocated resource may include the frequency resources and orthogonal prototype filter resources.

The flowchart of FIG. 10 is directed to the control procedure for selecting the best filter for communication between base stations and their cell edge terminals. Briefly, FIG. 10 depicts a case of using a predetermined common prototype filter rather than the best filters between each of the base stations and their cell edge terminals. The procedure of FIG. 10 is capable of resolving the conflict over selection of the best orthogonal prototype filters between each of the multiple base stations and their cell edge terminals. A base station may be configured not to select the prototype filters that have been already selected by neighboring base stations based on the information acquired at step 1000. It may also be possible, at step 1000, for the base stations to exchange the indices of the prototype filters withdrawn after completion of communication.

Figure 11:
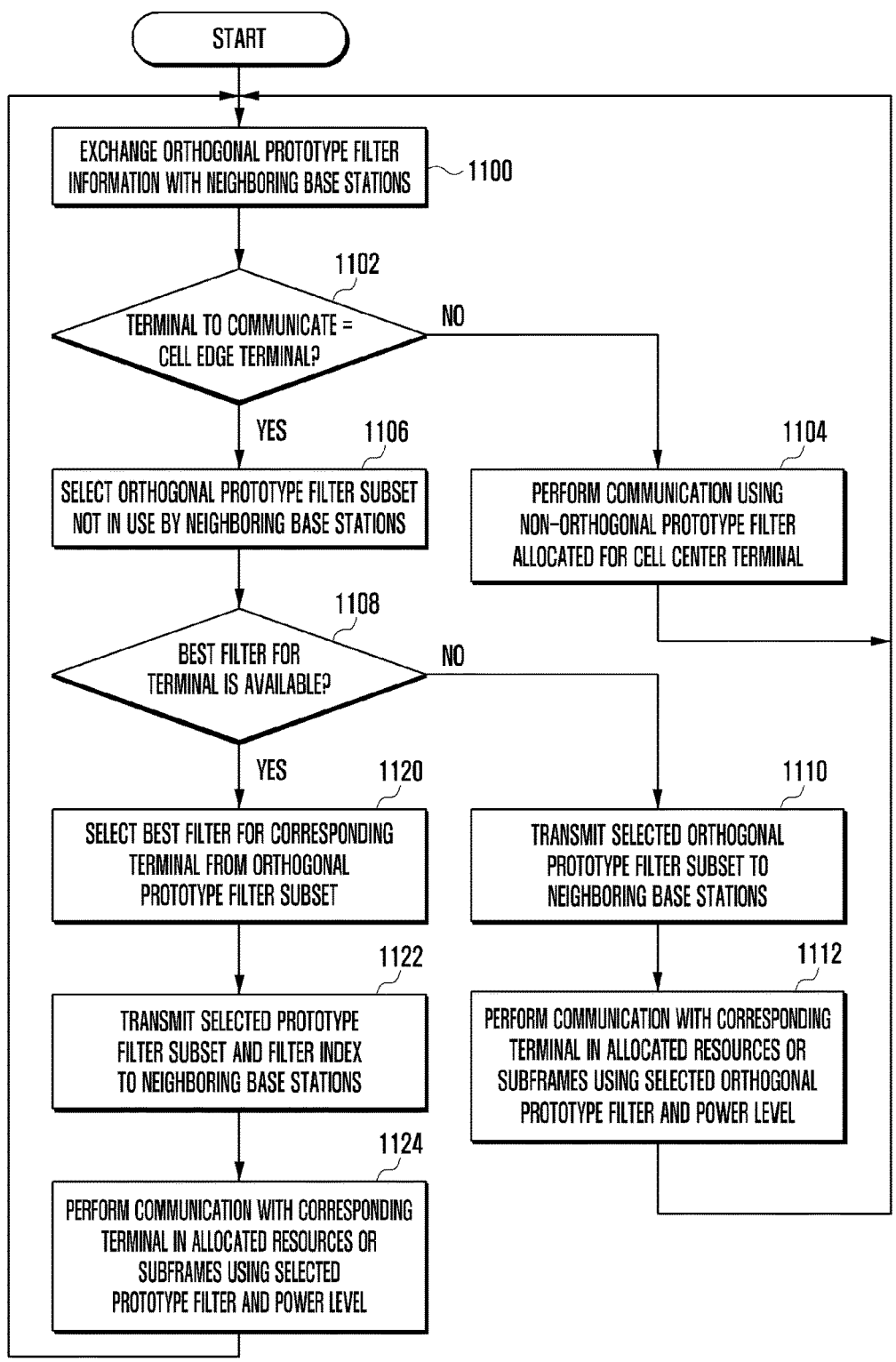
FIG. 11 is a flowchart illustrating a prototype filter selection procedure of a base station according to another embodiment of the present invention.

FIG. 11 is a flowchart illustrating a prototype filter selection procedure of a base station according to another embodiment of the present invention.

As assumed in the description with reference to FIG. 10, the procedure of FIG. 11 is also described with the reference numbers used in FIG. 8B. However, it is obvious to those in the art that the embodiment of FIG. 11 is applicable to the case of using the receiver configured as shown in FIG. 8C. The control operation of FIG. 11 may be performed by a scheduler of a base station or the transmission controller 809 of FIG. 8B or the transmission controller 819 of FIG. 8C. The following description is made with the assumption of the operation of the transmission controller 809 of FIG. 8B for convenience of explanation.

The transmission controller 809 controls to exchange the orthogonal prototype filter information with neighboring base stations at step 1100. The orthogonal prototype filter information may be exchanged through an inter-base station interface (not shown in FIGS. 8B and 8C). In order to receive the orthogonal prototype filter information from the neighboring base stations, the received orthogonal prototype filter information may include allocation information of orthogonal prototype filter based on resource block or subframe. The transmission controller 809 may control to receive the orthogonal prototype filter allocation information from the neighboring base stations and to transmit to the neighboring base stations the information on the prototype filters which it has allocated to terminal(s). The detailed description thereof has been made with reference to FIG. 5 and thus is omitted herein.

Next, the transmission controller 809 may detect a necessity of communication with a terminal and determine at step 1102 whether the terminal is a cell edge terminal. As described above, it may be possible to discover a cell edge terminal in various ways, and it should be noted that the present invention is not limited by specific cell edge terminal discovery methods.

If it is determined at step 1102 that the terminal is a cell edge terminal, the procedure goes to step 1106; otherwise if the terminal is a cell center terminal, the procedure goes to step 1104.

At step 1104, the transmission controller 809 controls to allocate a non-orthogonal prototype filter to the cell center terminal and communicate with the corresponding terminal using the non-orthogonal prototype filter. That is, the transmission controller 809 generates a non-orthogonal prototype filter selection signal to the prototype filter unit 807. In this way, it may be possible to communicate with the cell center terminal using a non-orthogonal prototype filter. The description of the non-orthogonal prototype filter has been already made with reference to FIGS. 3 and 4A and thus is omitted herein.

At step 1106, the transmission controller 809 selects an orthogonal prototype filter subset not in use by neighboring base stations based on the information received at step 1100 for communication with the cell edge terminal. The reason of selecting an orthogonal prototype filter subset is to minimize the interference caused by the signals transmitted by the neighboring base stations because the cell edge terminal may receive signals transmitted by neighboring base stations. Next, the transmission controller 809 determines whether the best prototype filter for the terminal is available. If it is determined at step 1108 that the best prototype filter for the terminal is available, the procedure goes to step 1120; otherwise if it is determined that the best prototype filter for the terminal is not available, the procedure goes to step 1110.

A description is made of the case where the procedure progresses to step 1110. At step 1110, the transmission controller 809 transmits to the neighboring base station the selected orthogonal prototype filter subset and filter index information. That is, the operation of step 1110 is performed to prohibit the neighboring base stations from using the prototype filter that it has selected for use in communication with the corresponding terminal.

After transmitting to the neighboring base stations the index of the prototype filter subset and prototype filter index selected for communication with the corresponding terminal, the transmission controller 809 may control to communicate with the corresponding terminal at step 1112 by applying the selected orthogonal prototype filter and power level at the resources or subframes allocated to the corresponding terminal.

As described with reference to FIG. 10, a base station has to allocate frequency resources such as subframes (or code resources in a certain system) as well as filter resources for communication with a certain terminal. Also, the base station has to select a suitable transmit power level based on the distance from the terminal to communicate and the channel condition. The operation of step 1112 includes applying the suitable power level on the allocated resources. The allocated resource may include the frequency resources and orthogonal prototype filter resources. That is, the subsequent operations being performed when the best prototype filter for the terminal is not available at step 1108 may be identical with those performed when the terminal is a cell center terminal in the procedure of FIG. 10.

A description is made of the case where the procedure progresses from step 1108 to step 1120. At step 1120, the transmission controller 809 selects the best filter for the corresponding cell edge terminal from the orthogonal prototype filter subset. This is the operation of selecting the prototype filter being expected to show the maximum efficiency in communication with the corresponding terminal in the orthogonal prototype filter subset. If a prototype filter is expected to provide the maximum efficiency, this means that the prototype filter makes it possible for a base station to transmit data at the highest data rate and/or at the lowest transmit power level under the assumption that the rate is fixed for all orthogonal prototype filters. Also, the operation of step 1120 may be performed to select the orthogonal prototype filter contributing to the maximum throughput of the communication system.

Next, the transmission controller 809 transmits the selected prototype filter sub set and prototype filter index to the neighboring base stations at step 1122. The selected prototype filter information may be transmitted to the neighboring base stations in units of allocated resource block or subframe. Next, at step 1124 the transmission controller 809 may control to communicate with the corresponding terminal by applying the selected orthogonal prototype filter and power level at the resources or subframes allocated to the corresponding terminal. The description of the power level being configured for the corresponding terminal has been already described above and thus is omitted herein.

The flowchart of FIG. 11 is directed to the control procedure for selecting the best filter for communication between base stations and their cell edge terminals. Briefly, in a situation where a plurality of base stations communicates with their cell edge terminals, it is necessary to select the best filters for the respective channels established between the base stations and their cell edge terminals. In this case, the base stations may be interested in different prototype filter indices. Accordingly, it may be necessary for each base station to update the best prototype filter for its communication channel by selecting the index indicating the best prototype filter in the procedure of FIG. 11. However, a base station may be configured not to select prototype filters that have been already selected by the neighboring base stations based on the information acquired at step 1100. It may also be possible, at step 1100, for the base stations to exchange the indices of the prototype filters withdrawn after completion of communication. The flowchart of FIG. 11 may cover the situation where the best filter for a terminal is available and the situation where the best filter for the terminal is not available as directed in the flowchart of FIG. 10.

Figure 12:
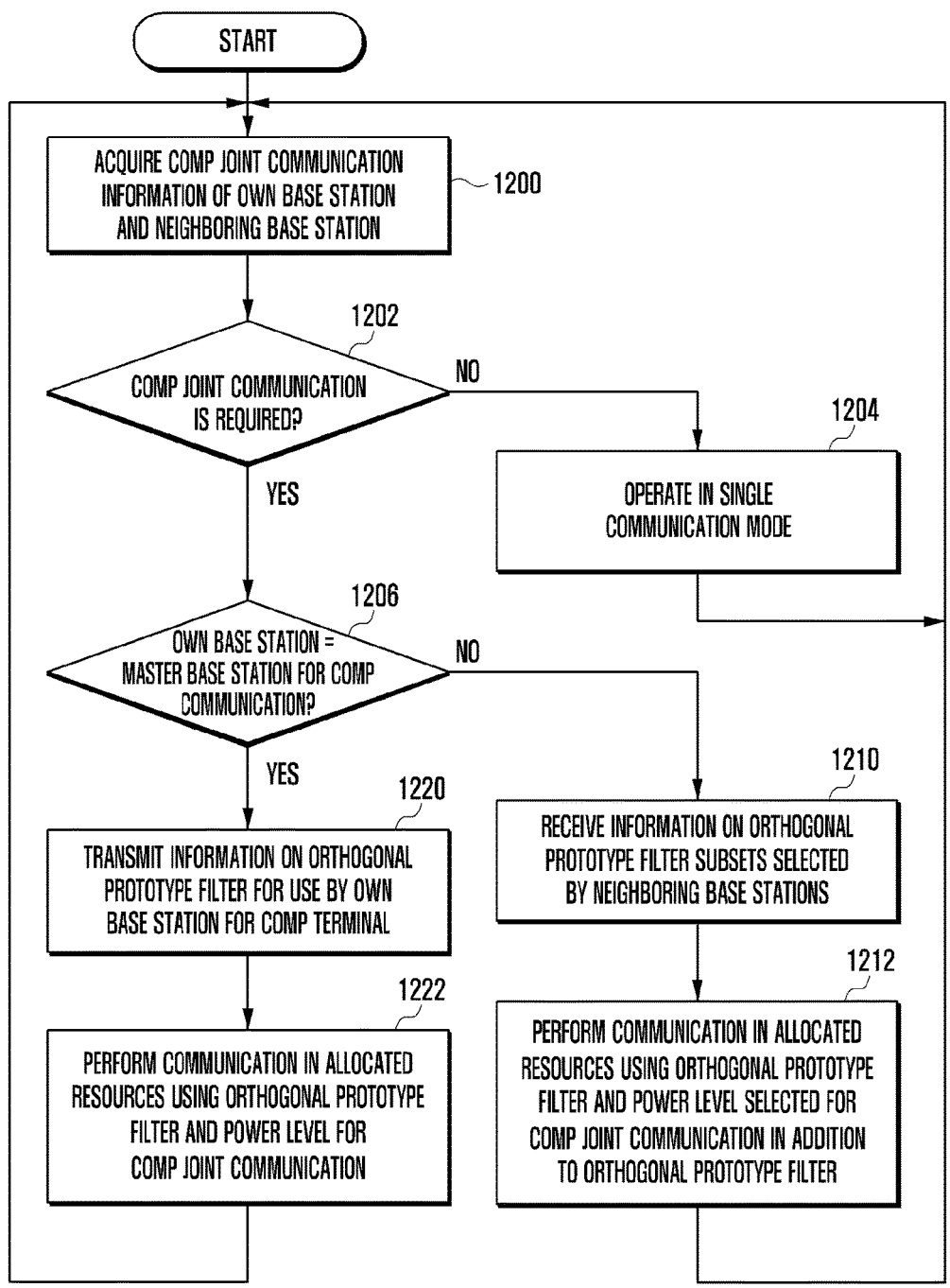
FIG. 12 is a flowchart illustrating a prototype filter selection procedure of a base station according to still another embodiment of the present invention.

FIG. 12 is a flowchart illustrating a prototype filter selection procedure of a base station according to still another embodiment of the present invention.

The flowchart of FIG. 12 is directed to the Coordinated Multi-Point (CoMP) Joint Transmission/Reception in which two or more base stations take part. It should be noted that the two or more base stations participating in the CoMP communication transmit and receive data simultaneously beyond sharing only channel information. In the following specification and claims, the term "CoMP" is used to denote a situation where two or more base stations transmit or receive data to and from one terminal.

As assumed above, the procedure of FIG. 12 is also described with the reference numbers used in FIG. 8B. However, it is obvious to those in the art that the embodiment of FIG. 12 is applicable to the case of using the receiver configured as shown in FIG. 8C. The control operation of FIG. 12 may be performed by a scheduler of a base station or the transmission controller 809 of FIG. 8B or the transmission controller 819 of FIG. 8C. The following description is made with the assumption of the operation of the transmission controller 809 of FIG. 8B for convenience of explanation.

The transmission controller 809 acquires at step 1200 the information on the CoMP transmission and reception in which its own base station and neighboring base stations take part. The CoMP transmission and reception information of its own base station may be read out from a memory of a scheduler, and the CoMP transmission and reception information of the neighboring base stations may be received from the corresponding base station through the inter-base station interface (not shown in FIGS. 8B and 8C).

Next, the transmission controller 809 may detect a necessity of communication with a terminal and determine at step 1202 whether a CoMP communication is required for the terminal. If it is determined at step 1202 that CoMP communication is required, the procedure goes to step 1206; otherwise it is determined that CoMP communication is not required, the procedure goes to step 1204. First, a description is made of the case where CoMP communication is not required and thus the procedure progresses to step 1204.

At step 1204, the transmission controller 809 activates a single communication mode rather than the CoMP communication mode. Here, the single transmission mode may be the equivalent of the operation mode as described with reference to FIG. 10 or FIG. 11. The detailed description of step 1204 is omitted herein because FIG. 12 is directed to the CoMP communication.

If it is determined at step 1202 that the CoMP communication is required, the transmission controller 809 determines at step 1206 whether its own base station is a master of the CoMP communication. Typically, it is necessary to designate a master base station for making various determinations, such as modulation order and coding rate determination, concerning the CoMP communication in which multiple base stations take part. In a situation where macro and small cells coexist, it is typical that the macro cell becomes the master. However, if need be, it may also be possible for a small cell to operate as the master. The present invention can be applied regardless of which cell becomes the master cell.

The operation of step 1206 is performed by a base station to determine whether it is a master base station. If it is determined that the base station is the master base station, the procedure goes to step 1220; otherwise, if it is determined that the base station is not the master base station, the procedure goes to step 1210.

At step 1210, the transmission controller 809 receives orthogonal prototype filter subset information from a neighboring base station, i.e. the master base station. The orthogonal prototype filter subset information may be the information provided in units of resource block or subframe.

If the procedure progresses to step 1210, this means that the master base station for the CoMP communication is a neighboring base station; thus, the base station has to operate under the control of the master base station. The transmission controller 809 may apply at least one of reserved prototype filters for CoMP transmission and reception and determine a power level for communication with the corresponding terminal at step 1212.

In more detail, two or more base stations which have taken part in the CoMP transmission/reception may transmit or receive the same data to and from one terminal at step 1212. Accordingly, the transmission controller 809 of the base station has to use the same orthogonal filter as that allocated by the neighboring master base station because it is determined at step 1212 that the base station is not the master base station. However, the transmission controller 809 of the non-master base station has to apply a certain prototype filter for supporting communication with the terminals located within its cell regardless of the CoMP communication. For example, the transmission controller 809 of the non-master base station may communicate with terminals located within its cell other than the CoMP terminal using the orthogonal prototype filters remaining after allocating an orthogonal prototype filter for the CoMP communication.

As analogized from the operation of step 1210, the orthogonal prototype filters may be categorized into two types by taking notice of CoMP communication. The aim of the first type of the orthogonal prototype filters may consist in removing interference among the neighboring base stations (or cells) serving their cell edge terminals. The aim of the second type of the orthogonal prototype filters may consist of supporting CoMP communication with the cell edge terminals. In this way, it may be possible to designate a specific purpose by the prototype filter or the prototype filter set in generating or setting the orthogonal prototype filters.

In the case that a base station is not the master base station for the CoMP communication, the non-master base station may transmit data to the CoMP terminal using an orthogonal prototype filter. As a consequence, the CoMP terminal may receive the data from the CoMP base stations with the same orthogonal prototype filter in specific resources.

Next, a description is made of the case where the base station is determined as the master base station, i.e., the procedure progresses from step 1206 to 1220.

At step 1220, the transmission controller 809 transmits to the other CoMP base stations or neighboring base stations the information on the orthogonal prototype filter that its own base station is supposed to allocate to the CoMP terminal. The information on the prototype filter being allocated to the CoMP terminal may be provided in units of resource block or subframe. Accordingly, the transmission controller 809 may transmit the orthogonal prototype filter information to the neighboring base stations or the CoMP base stations by the allocated resource blocks or subframes. In the case that the base station is the master base station for the CoMP communication, the master base station transmits to the neighboring base station the orthogonal prototype filter information for use in CoMP communication with the terminal. The CoMP base stations that have participated in the CoMP communication with the terminal, among the neighboring base stations, may transmit data to the CoMP terminal by applying the orthogonal prototype filter indicated in the orthogonal prototype filter information received from the CoMP master base station.

Next, the transmission controller 809 controls to perform the CoMP communication by applying the orthogonal prototype filter for CoMP transmission and reception on the resources, i.e., resource blocks or subframes allocated for the CoMP communication, at a power level determined for the corresponding terminal at step 1222. From the viewpoint of the network, a CoMP Joint technique for transmitting data to a certain terminal is characterized in that two or more base stations transmit the data to one terminal.

As described above, FIG. 12 is directed to a case where a base station performs CoMP Joint Transmission/reception operation for a terminal located in the cell edge area. The flowchart of FIG. 12 is similar to those of FIGS. 10 and 11 with the exception that the master and non-master CoMP base stations use the prototype filter of the same subset for data transmission and reception.

Figure 13A:
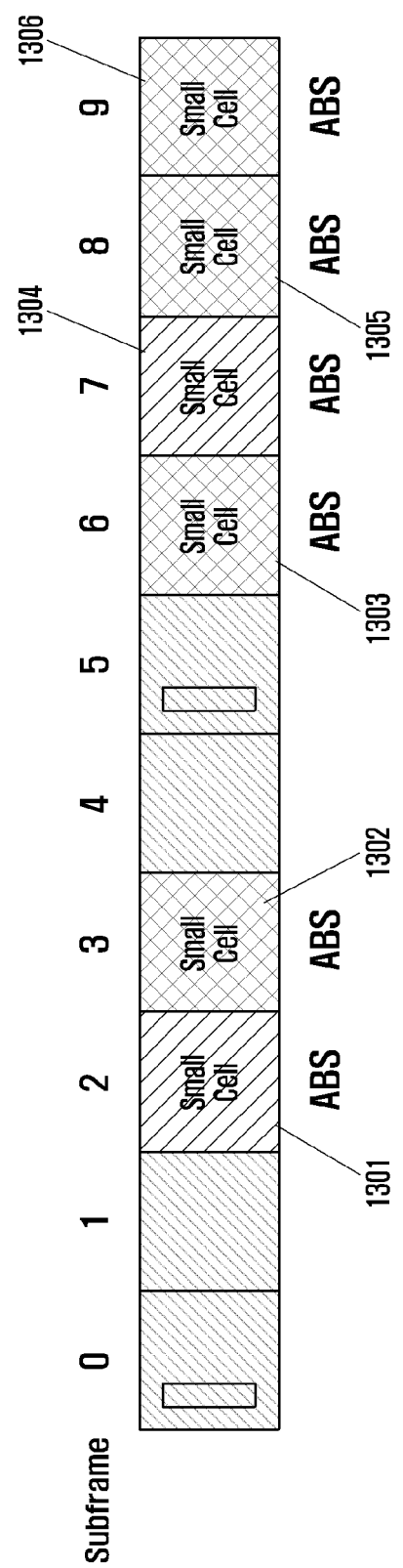
FIG. 13A is a diagram illustrating a frame structure specified in the eICIC Rel. 10 standard.
Figure 13B:
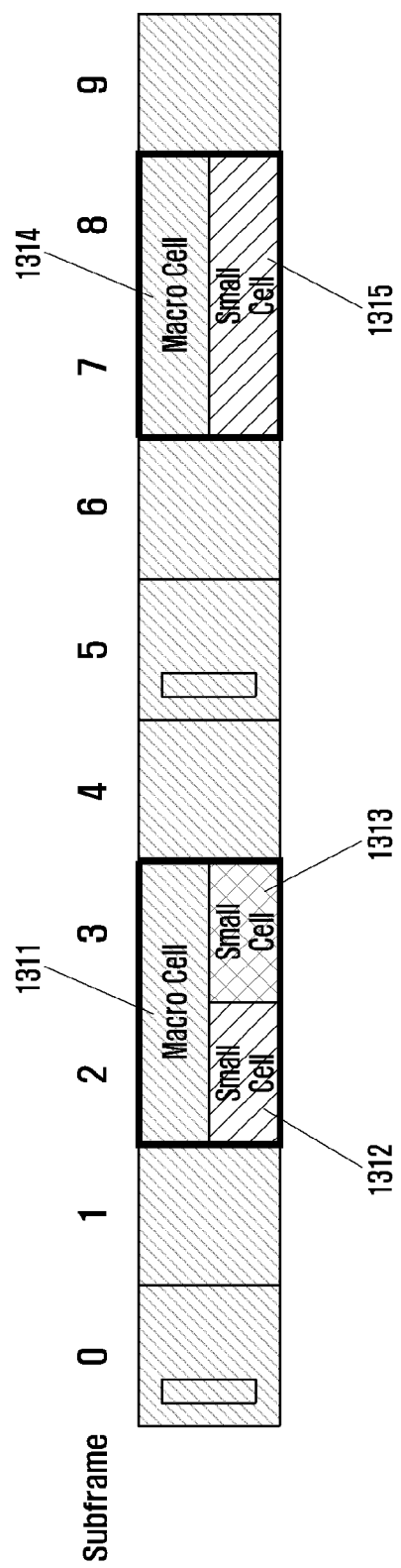
FIGS. 13B to 13D are diagrams illustrating frame structures modified for resource allocation according to the present invention.
Figure 13C:
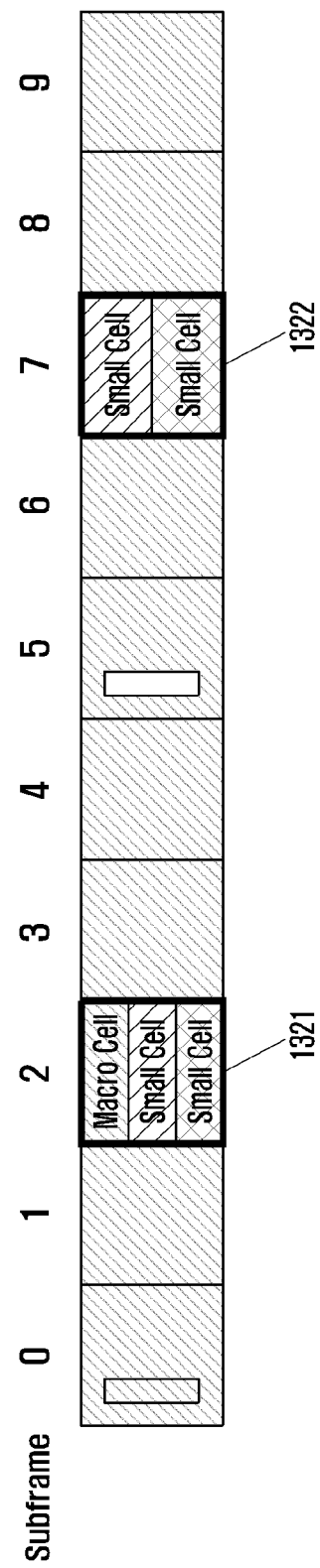
Figure 13D:
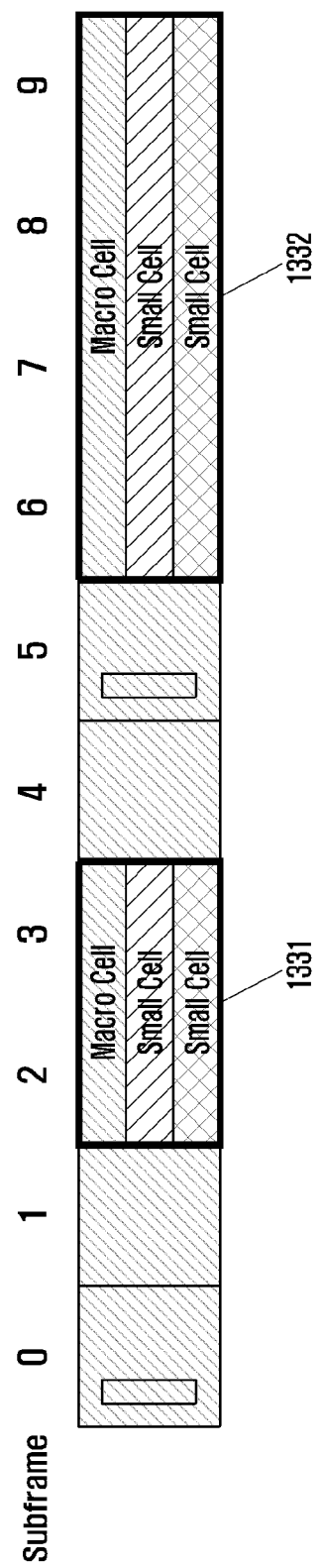

FIG. 13A is a diagram illustrating a structure of subframes specified in the eICIC Rel. 10 standard, and FIGS. 13B to 13D are diagrams illustrating subframes structures modified for resource allocation according to the present invention.

In reference to FIG. 13A, a radio frame includes a plurality of Almost Blank Subframes (ABSs) 1301, 1302, 1303, 1304, 1305, and 1306 in which the transmit power of the macro cell is blocked for supporting the enhanced Inter-Cell Interference Coordination (eICIC) technique to achieve coverage extension. The eICIC is a technique for forcibly distributing the load of the macro cell to the small cells so as to achieve cell range expansion.

In reference to FIG. 13B, the ABSs in which the transmit power of the macro cell is blocked as specified in the eICIC standard are configured such that macro and small cells share the resources of the same ABSs. For example, part 1311 of the resources of the first and second ABSs 1301 and 1302 reserved for small cells as specified in the eICIC standard, e.g., the small cells of the first and second small cell base stations 720 and 730 as exemplified in FIG. 7, are allocated for use by the macro base station 710 while the remaining parts 1312 and 1313 are still allocated for use by the small cell base stations 720 and 730, resulting in reduction of the resource amount reserved for small cells in comparison with that as specified in the eICIC standard. Also, the resources of the ABSs 1303 and 1306 reserved for small cells as specified in the eICIC standard, e.g., the small cell of the second small cell base station 730, are allocated for use by the macro cell base station 710, and part 1314 of the resources of the ABSs 1304 and 1305 reserved for small cells, e.g., the small cells of the small cell base stations 720 and 730, are allocated for use by the macro cell, e.g., the macro cell of the macro cell base station 710, while the remaining part 1315 of the resources of the ABSs 1304 and 1305 are still allocated for use by the first small cell base station 720.

With the frame structure of FIG. 13B, it may be possible to expect the following effects. Such a resource allocation method makes it possible to configure the network dynamically in a way of minimizing inter-cell interference using a small amount of information as the orthogonal prototype filter information between macro and small cells. For example, it may be possible to minimize inter-cell interference between a macro cell and a small cell that are performing transmission simultaneously using orthogonal prototype filters during the second subframe. Likewise, the macro small cell and another small cell perform transmission simultaneously during the third subframe. It may also be possible for the macro and small cells to perform transmission simultaneously during multiple subframes using orthogonal prototype filters.

In reference to FIG. 13C, among the ABSs 1301 to 1306 proposed in the eICIC standard, the resources of the first ABS 1301 are divided for use by the macro cell base station 710 and the first and second small cell base stations 720 and 730 as denoted by reference number 1321, and the resources of the fourth ABS 1304 are divided for use by the first and second small cell base stations 720 and 730 as denoted by reference number 1322.

With the frame structure of FIG. 13C, it may be possible to expect the following effects. Such a resource allocation method makes it possible for a macro cell base station and two small cell base stations to perform transmission simultaneously during one subframe using three orthogonal prototype filters. It may also be possible for two neighboring small cell base stations to perform transmission simultaneously, minimizing interference therebetween.

In reference to FIG. 13D, among the ABSs 1301 to 1306 proposed in the eICIC standard, the resources of the first and second ABSs 1301 and 1302 are divided for use by the macro cell base station 710 and the first and second small cell base stations 720 and 730 as denoted by reference number 1331, and the resources of the third and fourth ABSs 1303 and 1304 and the $8^{th}$ and $9^{th}$ subframes are divided for use by the macro cell base station 710 and the first and second small cell base stations 720 and 730 as denoted by reference number 1332.

With the frame structure of FIG. 13D, it may be possible to expect the following effects. Such a resource allocation method makes it possible for a macro cell base station and two small cell base stations to perform transmission simultaneously during multiple subframes.

In the case of applying the method proposed in the present invention to a HetNet, it is possible to minimize interference among the base stations that use the same FBMC scheme through the filter reuse scheme although they use different modulation and transmission schemes.

As described above, the present invention makes it possible to perform interference handling and resource allocation with the least feedback information through the filter reuse scheme regardless of the number of small cells deployed in a macro cell.

In partial frequency reuse (PFR) or soft frequency reuse (SFR) schemes, it is necessary to perform interference control and resource allocation by the resource block (RB). The filter reuse scheme is capable of minimizing feedback information amount without per-RB interference control and resource allocation because it can be used universally. The minimized feedback information makes it possible to control interference dynamically.

The embodiments disclosed in the specification and drawings are proposed to help explain and understand the present invention rather than limit the scope of the present invention. It is obvious to those skilled in the art that various modifications and changes can be made thereto without departing from the spirit and scope of the present invention. Thus, the scope of the invention should be determined by the appended claims and their legal equivalents rather than the specification, and various alterations and modifications within the definition and scope of the claims are included in the claims.

The present invention is applicable to filter bank-based multicarrier communication systems.

The invention claimed is:

1. A communication method in a base station communicating using a multicarrier signal based on a filter bank scheme, the method comprising:
    allocating, by the base station, a non-orthogonal filter to a first terminal located in a cell center area;
    selecting, by the base station, one of two or more orthogonal filter sets for a second terminal located within a cell edge area; and
    allocating, by the base station, at least one orthogonal filter included in the selected orthogonal filter set to the second terminal.

2. The method of claim 1, wherein selecting one of two or more orthogonal filter sets comprises determining the orthogonal filter sets to select based on a frequency reuse factor.

3. The method of claim 1, wherein allocating the at least one orthogonal filter comprises determining at least one orthogonal filter based on a cell identity information.

4. The method of claim 1, further comprising transmitting, when the orthogonal filter set is selected, to neighboring base stations, a filter set index indicating the selected orthogonal filter set.

5. The method of claim 4, wherein the filter set index is transmitted through an X2 interface or an Operations, Administration, and Maintenance (OAM) interface.

6. The method of claim 4, further comprising:
    determining, when the base station is operating in a coordinated communication mode along with two or more neighboring base stations, whether the base station is a master base station for data transmission to a terminal; and
    filtering, when the base station is not the master base station, data to be transmitted to the terminal using an orthogonal filter informed by a neighboring base station.

7. The method of claim 1, further comprising:
    receiving orthogonal prototype filter allocation information from neighboring base stations before allocating the orthogonal filter; and
    allocating, when the orthogonal prototype filter allocation information is received from the neighboring base stations before allocating the orthogonal filter, at least one orthogonal prototype filter sets remaining after allocating an orthogonal prototype filter set to the second terminal.

8. The method of claim 7, further comprising:
    determining, when allocating the orthogonal prototype filter to the second terminal, whether a best orthogonal prototype filter for the second terminal is available; and
    selecting, when the best orthogonal prototype filter for the second terminal is available, the best orthogonal prototype filter expected to provide a highest data rate for the second terminal among orthogonal prototype filters.

9. The method of claim 1, further comprising transmitting, when an orthogonal prototype filter is allocated to the second terminal, information on the orthogonal prototype filter allocated to the second terminal to the neighboring base stations.

10. A base station for communicating using a multicarrier signal based on a filter bank scheme, the base station comprising:
    a coder which encodes data to transmit;
    a modulator and mapper which performs modulation and mapping on the encoded data; and a transmission filter determination unit configured to:
perform an Inverse Fast Fourier Transform on the modulated and mapped encoded data, and
for a first terminal capable of communicating at a normal power level, allocate non-orthogonal filters to the first terminal, and
for a second terminal capable of communicating at a power level boosted from the normal power level, allocate an orthogonal filter to the second terminal.

11. The base station of claim 10, wherein the transmission filter determination unit selects one of two or more orthogonal filter sets based on a frequency reuse factor.

12. The base station of claim 11, wherein the transmission filter determination unit selects at least one orthogonal filter included in the selected orthogonal filter set based on a cell identity information.

13. The base station of claim 10, further comprising an interface for communication with neighboring base stations, wherein the transmission filter determination unit controls transmitting, when an orthogonal filter set is selected, to neighboring base stations a filter set index indicating the selected orthogonal filter set.

14. The base station of claim 13, wherein the interface is an X2 interface or an Operations, Administration, and Maintenance (OAM) interface.

15. The base station of claim 10, wherein the transmission filter determination unit further comprises:
an IFFT processing unit which performs Inverse Fast Fourier Transform (IFFT) on the modulated and mapped encoded data;
a prototype filter unit which includes non-orthogonal filters for allocation to the first terminal, which is capable of communicating at the normal power level, and orthogonal filter sets for allocation to the second terminal, which is capable of communicating at the power level boosted from the normal power level, and performs filtering on the IFFT-ed encoded data; and
a controller which selects one of the non-orthogonal filters or one of the orthogonal filter sets depending on a location of the second terminal to communicate data and controls the prototype filter unit to filter a signal input thereto with the selected non-orthogonal filter or orthogonal filter set.

16. The base station of claim 10, wherein the transmission filter determination unit comprises;
a prototype filter unit which includes the non-orthogonal filters for allocation to the first terminal, which is capable of communicating at the normal power level, and orthogonal filter sets for allocation to the second terminal, which is capable of communicating at the power level boosted from the normal power level, and performs filtering on the modulated and mapped encoded data;

an IFFT processing unit which performs Inverse Fast Fourier Transform (IFFT) on the modulated and mapped encoded data; and
a controller which selects one of the non-orthogonal filters or one of the orthogonal filter sets depending on the location of the second terminal to communicate data and controls the prototype filter unit to filter a signal input thereto with the selected non-orthogonal filter or orthogonal filter set.

17. An apparatus of a terminal for using a multicarrier signal based on a filter bank scheme, the apparatus comprising:
a channel reception unit which performs filtering on an input signal using a non-orthogonal filter or an orthogonal filter and Fast Fourier Transform (FFT) on the filtered input signal, channel estimation based on the FFT-ed input signal, and equalization on the FFT-ed input signal based on a channel estimation result;
a de-mapper which performs de-mapping on the equalized input signal in a reverse order of mapping performed at a transmission device;
a channel decoder which performs channel decoding on the de-mapped input signal; and
a reception controller which controls a prototype filter unit to select a filter for signal filtering based on filter information received from a base station.

18. The apparatus of claim 17, wherein the channel reception unit comprises:
a prototype filter unit which performs filtering on the input signal using the non-orthogonal filter or the orthogonal filter;
an FFT processing unit which performs the FFT on the filtered input signal;
a channel estimator which performs channel estimation based on output from the FFT processing unit; and
an equalizer which performs equalizing on the output from the FFT processing unit.

19. The apparatus of claim 17, wherein the channel reception unit comprises:
an FFT processing unit which performs FFT on the input signal;
a channel estimator which performs channel estimation based on output from the FFT processing unit;
an equalizer which performs equalization on the output from the FFT processing unit based on an output from the channel estimator; and
a prototype filter unit which performs filtering on output of the equalizer using the non-orthogonal filter or the orthogonal filter.

* * * * *